US007787485B2

(12) United States Patent
Howe et al.

(10) Patent No.: US 7,787,485 B2
(45) Date of Patent: Aug. 31, 2010

(54) METHOD OF TRANSMITTING A HIGH-PRIORITY MESSAGE IN A LIGHTING CONTROL SYSTEM

(75) Inventors: William H. Howe, Pennsburg, PA (US); Timothy S. Majewski, New Tripoli, PA (US); Daniel Curtis Raneri, Bethlehem, PA (US); Arya Abraham, Bethlehem, PA (US); R. Paul Stocker, Bethlehem, PA (US)

(73) Assignee: Lutron Electronics Co., Ltd., Coopersburg, PA (US)

( * ) Notice: Subject to any disclaimer, the term of this patent is extended or adjusted under 35 U.S.C. 154(b) by 670 days.

(21) Appl. No.: 11/703,912

(22) Filed: Feb. 8, 2007

(65) Prior Publication Data

US 2008/0192767 A1 Aug. 14, 2008

(51) Int. Cl.
*H04J 3/16* (2006.01)

(52) U.S. Cl. ...................................... 370/437; 370/449

(58) Field of Classification Search ................. 370/235, 370/230, 345, 395, 437, 449; 715/738; 455/41
See application file for complete search history.

(56) References Cited

U.S. PATENT DOCUMENTS

| | | | |
|---|---|---|---|
| 3,425,027 | A | 1/1969 | Patterson et al. |
| 3,444,521 | A | 5/1969 | Breese |
| 3,689,887 | A | 9/1972 | LaFalce |
| 3,806,872 | A | 4/1974 | Odom |
| 3,818,447 | A | 6/1974 | Craft |
| 3,863,220 | A | 1/1975 | Osawa |
| 3,950,728 | A | 4/1976 | Etchison et al. |
| 3,985,962 | A | 10/1976 | Jones |
| 4,500,987 | A | 2/1985 | Hasegawa |
| 4,829,297 | A | 5/1989 | Ilg et al. |
| 4,926,313 | A | 5/1990 | Byers et al. |
| 5,191,265 | A | 3/1993 | D'Aleo et al. |
| 5,463,286 | A | 10/1995 | D'Aleo et al. |
| 5,530,322 | A | 6/1996 | Ference et al. |
| 5,631,906 | A | 5/1997 | Liu |
| 5,642,101 | A | 6/1997 | Stirk |
| 5,736,965 | A | 4/1998 | Mosebrook et al. |
| 5,838,226 | A | 11/1998 | Houggy et al. |
| 5,848,054 | A | 12/1998 | Mosebrook et al. |

(Continued)

FOREIGN PATENT DOCUMENTS

| | | |
|---|---|---|
| GB | 2 345 998 | 7/2000 |
| WO | WO 03/007665 | 1/2003 |

*Primary Examiner*—Kwang B Yao
*Assistant Examiner*—Syed Bokhari
(74) *Attorney, Agent, or Firm*—Ostrolenk Faber LLP

(57) ABSTRACT

A lighting control system having a plurality of control devices coupled to a communication link operates with a communication protocol that allows the system to expeditiously process high-priority events while operating communicate at a low enough baud rate to allow for a free-wiring topology of the communication link. The transmission of regular-priority messages is suspended if any of the control devices has a high-priority message to transmit. To signal that a control device has a high-priority message to transmit, each control device is operable to transmit a break character in a predetermined time period after the transmission of one of the digital messages. After the transmission of the break character, the transmission of the regular-priority messages on the communication link is suspended to allow the high-priority message to be transmitted quickly.

22 Claims, 16 Drawing Sheets

U.S. PATENT DOCUMENTS

| | | | | |
|---|---|---|---|---|
| 5,905,442 | A | 5/1999 | Mosebrook et al. | |
| 5,949,200 | A | 9/1999 | Ference et al. | |
| 5,982,103 | A | 11/1999 | Mosebrook et al. | |
| 5,990,635 | A | 11/1999 | Ference et al. | |
| 6,002,669 | A * | 12/1999 | White | 370/235 |
| 6,046,550 | A | 4/2000 | Ference et al. | |
| 6,233,645 | B1 | 5/2001 | Chrysos et al. | |
| 6,331,756 | B1 | 12/2001 | Belliveau | |
| 6,388,399 | B1 | 5/2002 | Eckel et al. | |
| 6,392,368 | B1 | 5/2002 | Deller et al. | |
| 6,430,640 | B1 | 8/2002 | Lim | |
| 6,487,457 | B1 | 11/2002 | Hull et al. | |
| 6,519,509 | B1 | 2/2003 | Nierlich et al. | |
| 6,546,435 | B1 | 4/2003 | Yoshimura | |
| 6,653,933 | B2 | 11/2003 | Raschke et al. | |
| 6,658,017 | B2 * | 12/2003 | Yamamoto et al. | 370/437 |
| 6,687,487 | B1 | 2/2004 | Mosebrook et al. | |
| 6,803,728 | B2 | 10/2004 | Balasubramaniam et al. | |
| 6,813,525 | B2 | 11/2004 | Reid et al. | |
| 6,917,167 | B2 | 7/2005 | Courtney et al. | |
| 6,927,547 | B2 | 8/2005 | Walko, Jr. et al. | |
| 6,983,783 | B2 | 1/2006 | Carmen, Jr. et al. | |
| 7,085,627 | B2 | 8/2006 | Bamberger et al. | |
| 7,126,291 | B2 | 10/2006 | Kruse et al. | |
| 7,211,968 | B2 | 5/2007 | Adamson et al. | |
| 7,219,141 | B2 | 5/2007 | Bonasia et al. | |
| 7,307,542 | B1 | 12/2007 | Chandler et al. | |
| 7,309,965 | B2 | 12/2007 | Dowling et al. | |
| 7,394,451 | B1 | 7/2008 | Patten et al. | |
| 7,548,552 | B2 * | 6/2009 | Shvodian et al. | 370/449 |
| 7,558,269 | B2 * | 7/2009 | Le Pennec et al. | 370/395.42 |
| 2002/0047628 | A1 | 4/2002 | Morgan et al. | |
| 2002/0049822 | A1 | 4/2002 | Burkhardt et al. | |
| 2002/0130768 | A1 | 9/2002 | Che et al. | |
| 2003/0057886 | A1 | 3/2003 | Lys et al. | |
| 2003/0132722 | A1 | 7/2003 | Chansky et al. | |
| 2003/0222603 | A1 | 12/2003 | Mogliner et al. | |
| 2004/0002792 | A1 | 1/2004 | Hoffknecht | |
| 2005/0280598 | A1 | 12/2005 | Webb et al. | |
| 2006/0273970 | A1 | 12/2006 | Mosebrook et al. | |
| 2006/0284734 | A1 | 12/2006 | Newman, Jr. | |
| 2007/0061050 | A1 | 3/2007 | Hoffknecht | |
| 2007/0161349 | A1 * | 7/2007 | Grushkevich | 455/41.2 |
| 2007/0165589 | A1 * | 7/2007 | Sakoda | 370/345 |
| 2008/0101224 | A1 * | 5/2008 | Khasnabish | 370/230 |
| 2008/0125057 | A1 | 5/2008 | Nass | |
| 2008/0163065 | A1 * | 7/2008 | Vartiainen et al. | 715/738 |
| 2008/0191837 | A1 | 8/2008 | Stocker | |

* cited by examiner

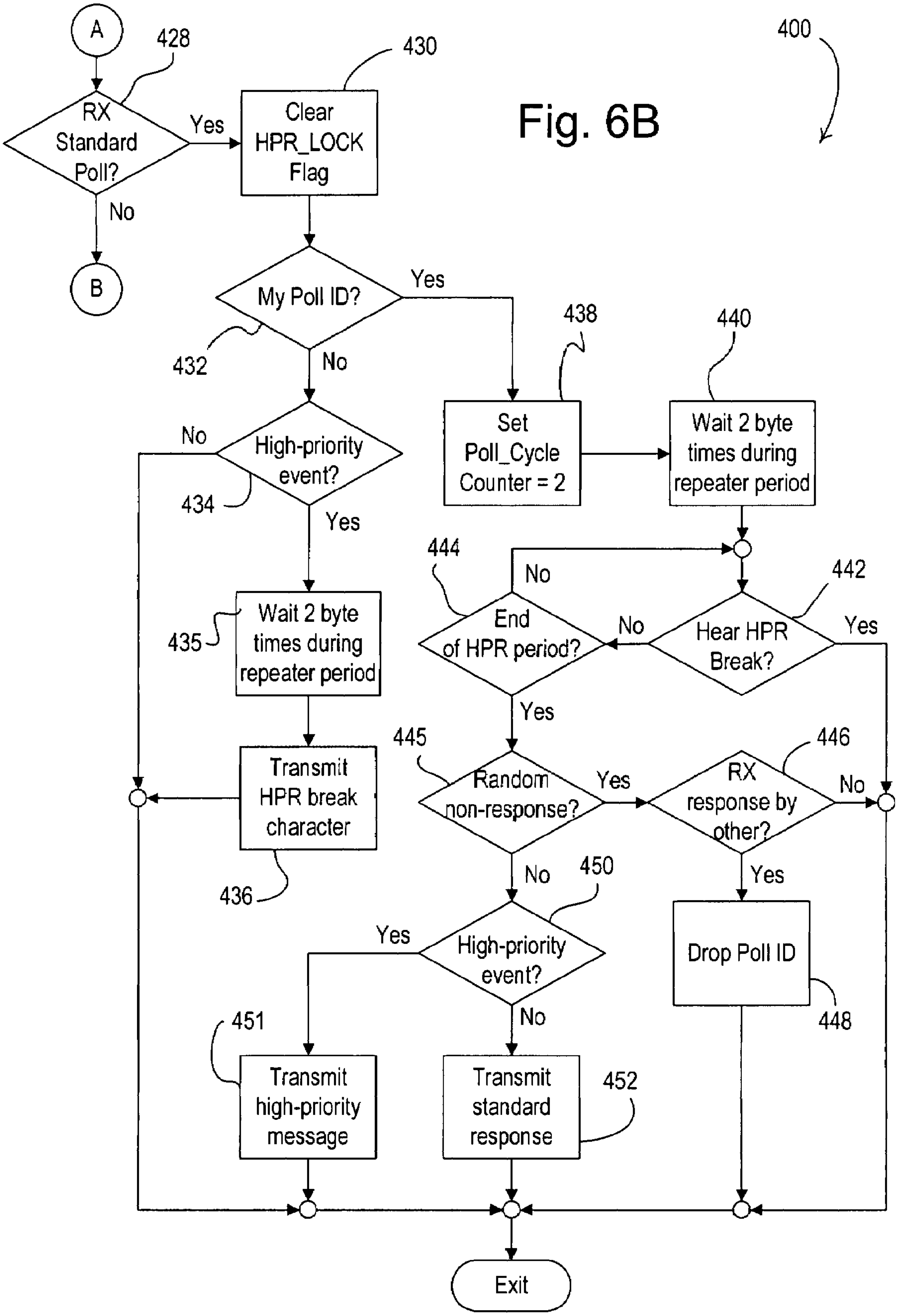

A
428
RX Standard Poll?
Yes
No
B
430
Clear HPR_LOCK Flag
400
Fig. 6B
My Poll ID?
Yes
432
No
438
440
High-priority event?
No
434
Yes
Set Poll_Cycle Counter = 2
Wait 2 byte times during repeater period
444
No
442
435
Wait 2 byte times during repeater period
End of HPR period?
No
Hear HPR Break?
Yes
Yes
445
446
Transmit HPR break character
Random non-response?
Yes
RX response by other?
No
436
No
450
Yes
Yes
High-priority event?
Drop Poll ID
No
448
451
Transmit high-priority message
Transmit standard response
452
Exit

METHOD OF TRANSMITTING A HIGH-PRIORITY MESSAGE IN A LIGHTING CONTROL SYSTEM

BACKGROUND OF THE INVENTION

1. Field of the Invention

The present invention relates to a load control system having a plurality of control devices and operable to control the amount of power delivered to a plurality of electrical loads from an AC power source, and more particularly, to a novel communication protocol for allowing the control devices of the load control system to communicate with each other.

2. Description of the Related Art

Typical load control systems are operable to control the amount of power delivered to an electrical load, such as a lighting load or a motor load, from an alternating-current (AC) power source. A load control system generally comprises a plurality of control devices coupled to a communication link to allow for communication between the control devices. The control devices of a lighting control system include load control devices operable to control the amount of power delivered to the loads in response to digital messages received across the communication link, or in response to local inputs, such as user actuations of a button. Further, the control devices of a lighting control system often include one or more keypad controllers that transmit commands across the communication link in order to control the loads coupled to the load control devices. An example of a lighting control system is described in greater detail in commonly-assigned U.S. Pat. No. 6,803,728, issued Oct. 12, 2004, entitled SYSTEM FOR CONTROL OF DEVICES, which is incorporated herein by reference in its entirety.

Many prior art lighting control systems use polling techniques to allow the control devices to communicate with each other. In order to execute the polling technique, one control device of the lighting control system must first establish itself as a “master” device. Then, the master device is operable to sequentially transmit poll messages to and receive responses from each of the other control devices in the control system. The response to the poll message may comprise an event to report (e.g., the actuation of a button on a keypad or another high-priority event) or simply a status update message. When a button of a keypad is actuated, the load control devices typically control the lighting loads appropriately. Since the user expects the lighting loads to respond quickly to the actuation of the button of the keypad, the response time of the lighting control system must be rather small, such that the user does not perceive a significant delay.

The master device must complete a polling cycle (i.e., transmitting a poll message to and then receiving a response from each of the control devices in the lighting control system) before repeating the polling cycle. Thus, there can be a rather long time period between when a control device has a high-priority message (corresponding to a high-priority event such as a button actuation) ready to transmit and when the master device polls the control device, thus allowing the control device to transmit the high-priority message. In order to process high-priority messages with an appropriate response time, prior art lighting control systems executing the polling technique either have been limited to a smaller number of control devices in the system (e.g., 32 control devices) or have required a high baud rate (e.g., 125 kbps) to transmit the digital messages between a larger number of control devices (e.g., 64 control devices). When the lighting control systems use a high baud rate, the control devices must be wired together using specific wiring topologies, e.g., a daisy-chain topology, which complicates the installation procedure of the lighting control system. Likewise, limiting the number of control devices that a master device can communicate with to a small number complicates the installation procedure. A lighting control system that is limited to only 32 control devices require the introduction of advanced control devices, such as multi-link processors, to scale beyond the limited number of control devices.

Therefore, there exists a need for a robust communication protocol that uses a polling technique and a low enough baud rate to provide for a free-wiring scheme, while still allowing special events to be executed in a timely manner.

SUMMARY OF THE INVENTION

According to the present invention, a method of transmitting a high-priority digital message via a communication link comprises the steps of: (1) transmitting regular-priority digital messages between a plurality of control devices; (2) signaling that one of the plurality of control devices has a high-priority digital message to transmit; (3) suspending the transmission of the regular-priority digital messages between the plurality of control devices; and (4) transmitting the high-priority digital message during the suspension of the transmission of the regular-priority digital messages.

According to a first embodiment of the present invention, a method of transmitting a high-priority digital message from a second control device to a first control device comprises the steps of: (1) the first device transmitting a first message; (2) the second device transmitting a high-priority break character during a predetermined time period following the first device transmitting the first message; (3) the first device transmitting a second message to the second device in response to receiving the high-priority break character; and (4) the second device transmitting the high-priority digital message to the first device in response to the second message.

According to a second embodiment of the present invention, a method of transmitting a high-priority digital message from a second control device to a first control device comprises the steps of: (1) the first device beginning to transmit a regular-priority digital message during a first predetermined time slot; (2) the second device transmitting a break character during a predetermined time period following the end of the regular-priority message; (3) the first device suspending the transmission of regular-priority digital messages in response to receiving the break character; and (4) the second device beginning to transmit the high-priority digital message during a second predetermined time slot while the first device has suspended the transmission of regular-priority digital messages.

The present invention further provides a method of polling a plurality of control devices on a communication link. Each of the plurality of control devices has a unique Poll ID. The method comprising the steps of: (1) sequentially transmitting a poll message to each of the plurality of control devices using the Poll ID of each control device; (2) transmitting a break character in a predetermined time period following one of the poll messages; (3) suspending the sequential transmission of poll messages in response to the step of transmitting a break character; (4) determining which one of the plurality of control devices transmitted the break character; (5) transmitting a request message to the one of the plurality of control devices that transmitted the break character; and (6) transmitting from the one of the plurality of control devices that transmitted the break character a high-priority digital message in response to the request message.

In addition, the present invention provides a method of polling a plurality of control devices by a master device selected from said plurality of control devices. Each of the plurality of control devices is coupled to a communication link and includes a unique Poll ID. The method comprises the steps of: (1) the master device sequentially transmitting a poll message to each control device marked active in a list of Poll IDs, the poll message including a status request; (2) each of the control devices responding to the poll message when the Poll ID of the device matches the Poll ID of the poll message; (3) one of the control devices transmitting a high-priority request; (4) the master device interrupting the sequential transmission of poll messages when the high-priority request is received; and (5) performing a binary search to find the Poll ID of the control device that provided the high-priority request.

According to another aspect of the present invention, a method of transmitting a high-priority digital message between a plurality of control devices via a communication link comprises the steps of: (1) operating the communication link in a normal mode of operation by transmitting regular-priority digital messages between the plurality of control devices; (2) signaling that one of the plurality of control devices has a high-priority digital message to transmit; (3) changing the communication link to a high-priority mode of operation in response to the step of signaling, the transmission of regular-priority digital messages suspended in the high-priority mode of operation; and (4) transmitting the high-priority digital message while the communication link is in the high-priority mode of operation.

The present invention further provides a control device for a lighting control system having a communication link. The control device comprises a communication circuit, a controller, and an input. The communication circuit is operable to be coupled to the communication link for transmission and receipt of digital messages. The controller is coupled to the communication circuit and operable to control the transmission and receipt of the digital messages. The input is coupled to the controller, such that the controller is operable to transmit a first message having a regular-priority and further operable to transmit a second message having a high-priority in response to the input.

Other features and advantages of the present invention will become apparent from the following description of the invention that refers to the accompanying drawings.

BRIEF DESCRIPTION OF THE DRAWINGS

FIGS. 6A, 6B, and 6C are flowcharts of a message processing procedure executed by each of the control devices of the load control system of FIG. 4 according to the present invention;

DETAILED DESCRIPTION OF THE INVENTION

Figure 1:
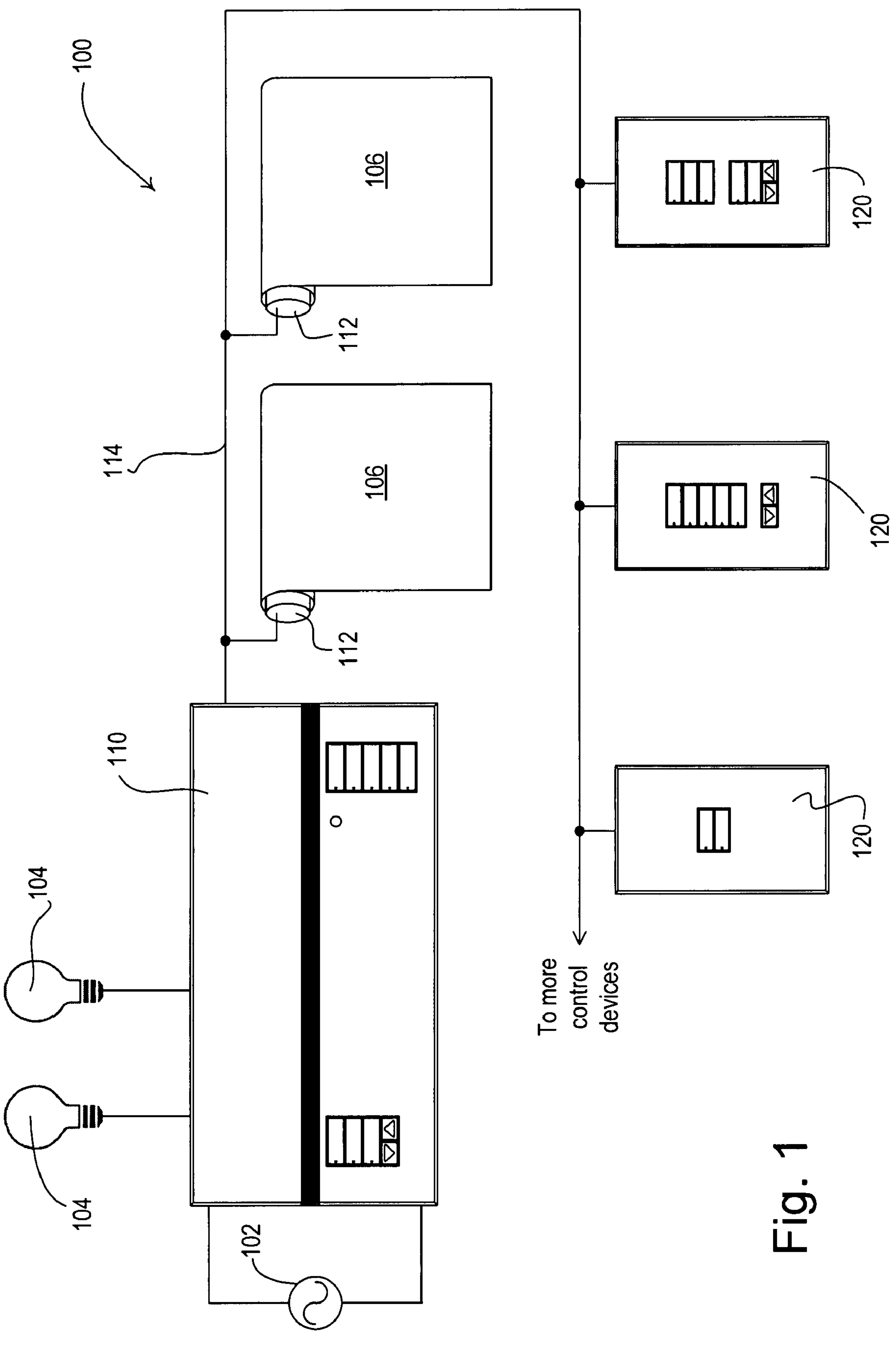
FIG. 1 is a simplified block diagram of a load control system for controlling lighting loads and motorized window treatments.

The foregoing summary, as well as the following detailed description of the preferred embodiments, is better understood when read in conjunction with the appended drawings. For the purpose of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a load control system 100 coupled to an AC power source 102 for control of a plurality of lighting loads 104 and a plurality of motorized window treatments, e.g., motorized roller shades 106. The load control system 100 comprises a multi-zone load control device 110, which comprises integral dimmer circuits for controlling the intensities of the lighting loads 104. Each of the motorized roller shades 106 comprises an electronic drive unit (EDU) 112, which is preferably located inside the roller tube of the roller shade. An example of an electronic drive unit 112 is described in greater detail in commonly-assigned U.S. Pat. No. 6,983,783, issued Jun. 11, 2006, entitled MOTORIZED SHADE CONTROL SYSTEM, the entire disclosure of which is hereby incorporated by reference. The load control system 100 further comprises a plurality of input devices, e.g., keypads 120, for providing inputs to the load control system (e.g., a user input such as an actuation of a button). The input devices may also comprise, for example, occupancy sensors, daylight sensors, infrared receivers, and timeclocks.

The load control device 110 is operable to communicate with the electronic drive units 112 and the keypads 120 via a communication link 114 using a novel communication protocol according to the present invention. The communication link 114 preferably comprises a wired four-wire RS-485 communication link having a baud rate of 41.67 kbps. Each communication link 114 preferably comprises a first wire for a common connection, a second wire for providing a directcurrent (DC) voltage $V_{LINK}$ (e.g., 24 $V_{DC}$) to power the control devices on the device communication link, and third and fourth wires (i.e., data wires) for carrying digital messages between the control devices. The third and fourth wires carry differential communication signals, i.e., MUX and MUXBAR signals, according to the RS-485 protocol.

The load control device 110 and the electronic drive units 112 are responsive to digital messages received from the plurality of keypads 120. A user is able to adjust the intensities of the lighting loads 104 or to select a lighting preset of the load control device 110 using the keypads 120. The user is also able to open or close the motorized roller shades 106, adjust the position of the shade fabric of the roller shades, or set the roller shades to preset shade positions using the keypads 120.

Figure 2:
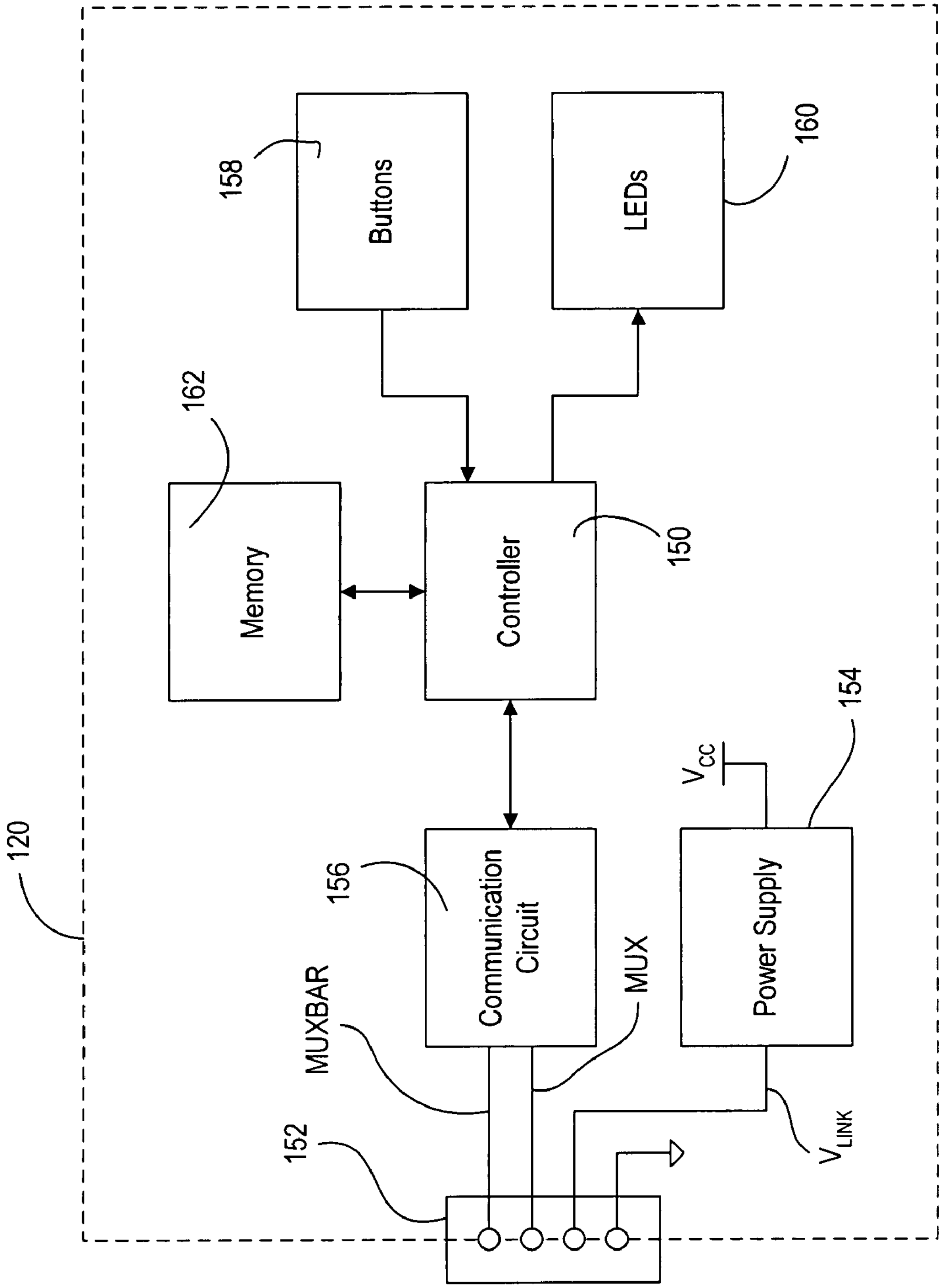
FIG. 2 is a simplified block diagram of a keypad of the load control system of FIG. 1.

FIG. 2 is a simplified block diagram of one of the keypads 120. The keypad 120 comprises a controller 150, which is preferably implemented as a microprocessor, but may be any suitable processing device, such as, for example, a microcontroller, a programmable logic device (PLD), or an application specific integrated circuit (ASIC). The keypad 120 is coupled to the four-wire communication link 114 via a four-position connector 152. A power supply 154 receives the DC voltage $V_{LINK}$ of the communication link 114 via the connector 152 and generates an internal DC voltage $V_{CC}$ (e.g., 5 $V_{DC}$) for powering the controller 150 and other low-voltage circuitry of the keypad 120.

A communication circuit 156, e.g., an RS-485 transceiver, is coupled to the data wires MUX and MUXBAR of the communication link 114. The controller 150 is coupled to the communication circuit 156, such that the controller 150 is operable to transmit and receive digital messages via the communication link 114. The controller 150 also receives inputs from a plurality of buttons 158, and controls a plurality of visual indicators, e.g., LEDs 160. The controller 150 is coupled to a memory 162 for storage of the configuration information of the keypad 120.

The load control device 110 and the electronic drive units 112 have similar structures to the keypads 120. In addition to the functional blocks shown in FIG. 2, the load control device 110 includes a plurality of load control circuits, such as dimmer circuits, for control of the amount of power delivered to the lighting loads 104. Further, the load control device 110 may comprise an additional power supply for generating the DC voltage $V_{LINK}$ for powering the control devices coupled to the communication link 114. The electronic drive units 112 also include motors, H-bridge circuits for driving the motors, and Hall-effect sensors for determining the positions of the shade fabrics as described in the '783 patent. The structures of the load control device 110 and the electronic drive units 112 are well known to those skilled in the art and are not described in greater detail herein.

Figure 4:
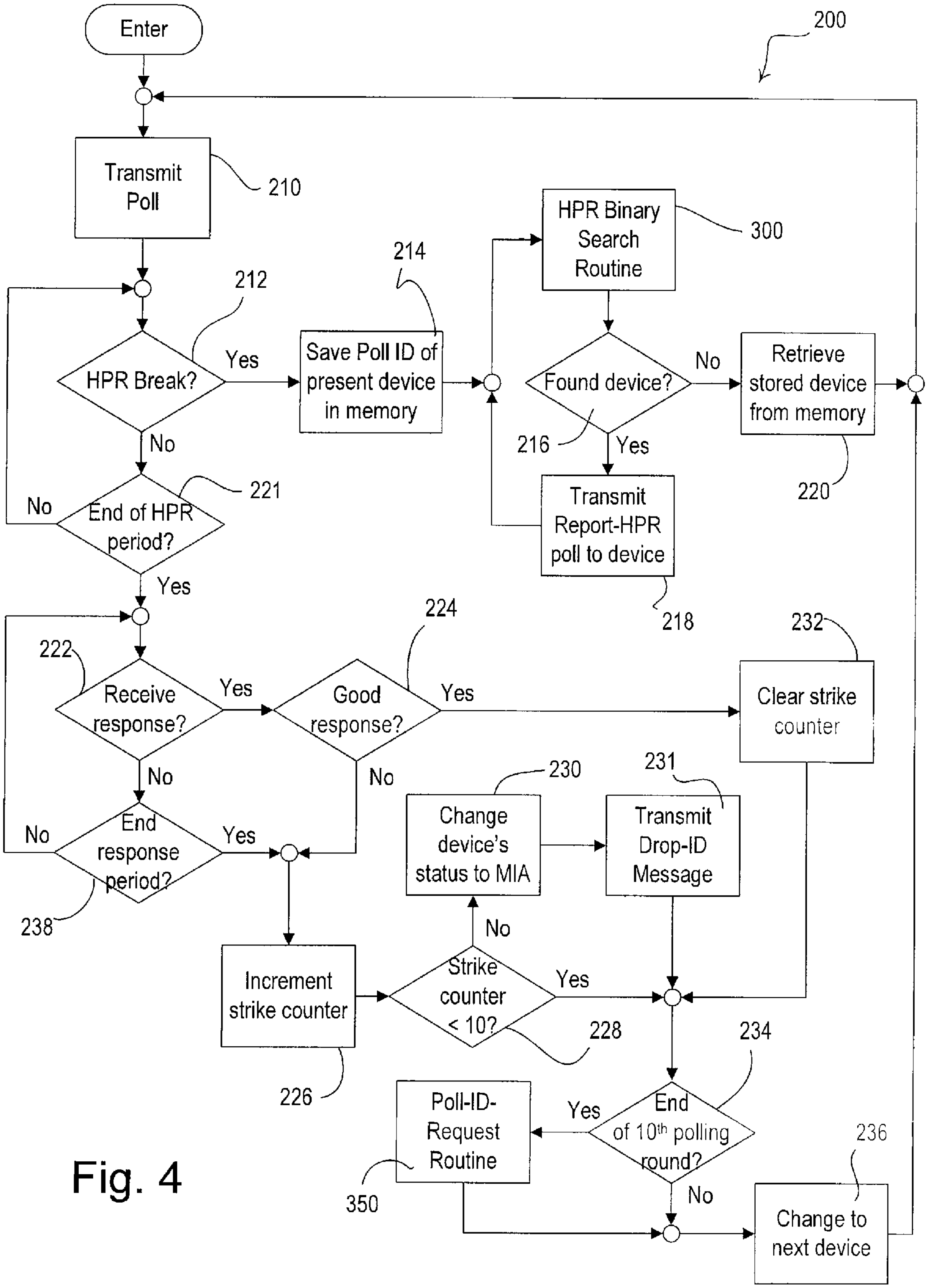
FIG. 4 is a flowchart of a master polling procedure executed by the master device of the load control system of FIG. 1 according to the present invention.

The control devices, i.e., the load control device 110, the electronic drive units 112, and the keypads 120, communicate with each other in accordance with the protocol of the present invention using a polling procedure 200 (as shown in FIG. 4). Specifically, one of the control devices is established as a "master" device each time all of the devices on the communication link 114 are powered up. During normal polling of the control devices (i.e., in a normal mode of operation), the master device transmits a standard poll message to each of the control devices present on the communication link 114 in succession. All control devices, including the master device, operate as "slave" devices to receive the standard poll messages and respond accordingly. When a slave device receives a standard poll message, the slave device is operable to respond with either a "Here" message or a "Status" message. The master device is further operable to transmit non-standard messages, for example, in the occurrence of a high-priority event at one of the slave devices, as will be described in greater detail below.

The control devices do not include DIP switches for setting the addresses, functionalities, and configurations of the control devices. Preferably, each of the control devices has a unique 32-bit serial number, which is assigned to the device during manufacture. The serial number is used to determine the programming of the lighting control system 100. For example, if one of the keypads is associated with the lighting control device 110, the lighting control device stores the serial number of the keypad in memory.

Since the serial numbers are rather large numbers, the master device does not include the serial number of the slave device to which the poll message is directed with each transmitted poll message. The master device transmits the poll messages to the slave devices on the communication link 114 using unique semi-permanent single-byte Poll IDs (i.e., unique link addresses). The serial number is used to determine the Poll ID of each control device, such that each control device on the communication link 114 has a different Poll ID. Preferably, the control devices store the Poll ID in the memory 162. The master device periodically broadcasts a Poll-ID-Request poll message (i.e., a non-standard poll message) to allow those slave devices on the communication link 114 that do not have a Poll ID to request a Poll ID.

The master device maintains a list of control devices present on the link and transmits poll messages to only those devices. If the master device is not transmitting standard poll messages to a specific slave device, the slave device is operable to drop its Poll ID and then request a new Poll ID. In response to the request for a new Poll ID, the master device determines the serial number of the control device and transmits a new Poll ID to the control device. The master device then has the new Poll ID stored in the list of control devices and accordingly begins transmitting poll messages to the control device. Also, a control device on the communication link 114 is operable to determine that another control device has the same Poll ID, to subsequently drop the Poll ID, and to acquire another Poll ID. The master device is operable to re-use those Poll IDs that control devices on the communication link 114 have dropped.

According to the present invention, the sequential polling of each device on the communication link 114 (i.e., the normal mode of operation) may be suspended if any of the control devices has a high-priority message to transmit. A high-priority message may be transmitted in response to a high-priority event occurring at the control device, for example, an actuation of one of the buttons 158 of one of the keypads 120. To signal a high-priority request (HPR), each of the control devices is operable to transmit a "break character" on the communication link 114 (i.e., to "assert the link") during a predetermined HPR time period following the end of a standard poll message transmitted to any of the control devices. For example, if the communication link 114 is one in which the link is at a low potential (i.e., substantially zero volts) when no control devices are transmitting digital messages on the communication link (i.e., when the link is in an idle state), the control device may drive the communication link high for a "byte-time" to transmit a break character. A byte-time is defined herein as the amount of time required to transmit one byte of data at the operating baud rate. In response to receiving a high-priority request, the master device is operable to change the communication link 114 to a high-priority mode of operation in which the transmissions of regular-priority messages are suspended. Regular-priority messages comprise, for example, a response to a standard poll message and a response to a Poll-ID-Request poll message.

Multiple control devices may simultaneously transmit the break character, and thus, the transmission of break characters is considered as "wired-OR" logic. The master device is operable to determine which of the control devices transmitted the break characters and have high-priority events to report using an HPR binary search routine 300 (shown in FIG. 5A). The master device subsequently polls the control devices found by the HPR binary search routine 300 for the high-priority events. The control devices are operable to prevent a single control device from monopolizing the bandwidth of the communication link 114 (e.g., if a user is repeatedly pressing a button on a keypad). Preferably, each control device is operable to exclude itself from responding to poll messages of the HPR binary search routine 300 subsequent to reporting a high-priority event until such time as a standard poll message is once again received.

The master device and the other control devices coupled to the communication link 114 are all operable to receive the high-priority events using a message processing procedure 400 (shown in FIGS. 6A, 6B, 6C) and to appropriately respond to the high-priority events to, for example, control the lighting loads 104 and the motorized roller shades 106. After all control devices have reported the high-priority events, the master device once again begins polling the control devices normally (i.e., returns to the normal mode of operation).

Figure 3A:
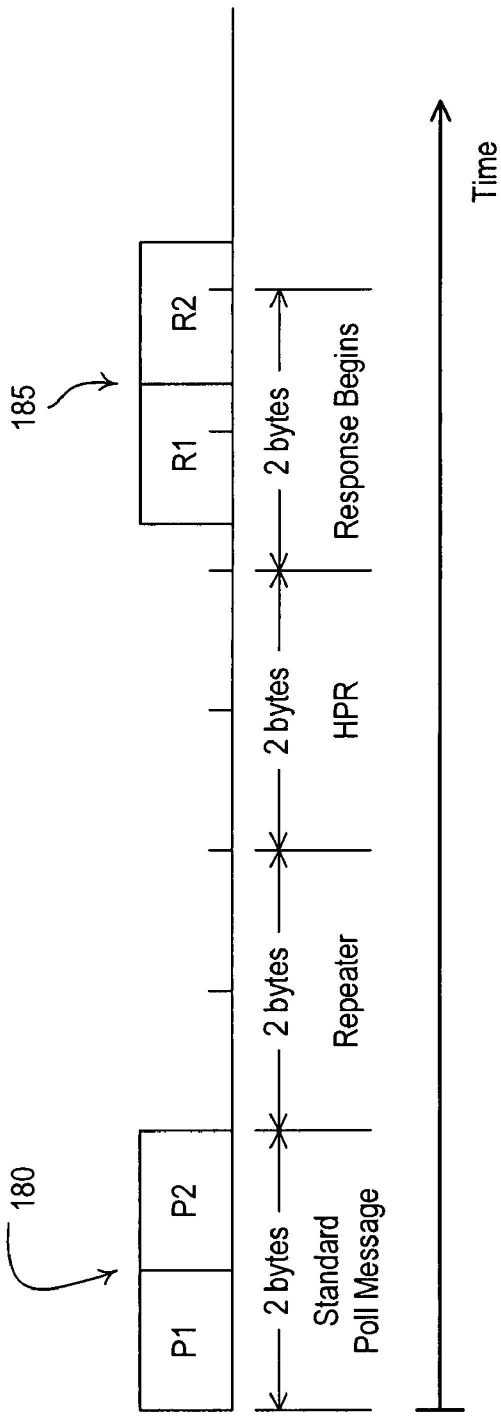
FIG. 3A is a timing diagram of a standard poll message transmitted by a master device of the load control system of FIG. 1 and a response to the standard poll message according to a novel protocol of the present invention.

FIG. 3A is a timing diagram of a standard poll message 180 transmitted by the master device and a response 185 to the standard poll message according to the novel protocol of the present invention. The standard poll message 180 preferably comprises two bytes P1, P2. The first poll byte P1 includes, for example, a standard poll message identifier and the second poll byte P2 includes the Poll ID of the control device to which the standard poll message 180 is being transmitted.

A repeater time period follows the end of the standard poll message 180 and is two byte-times in length. The length of the communication link 114 of the load control system 100 may be effectively lengthened using one or more repeater devices (not shown), which are control devices that are operable to buffer the poll messages onto additional lengths of wiring of the communication link 114. The electrical hardware of the repeater devices introduces a delay from when the repeater devices finish buffering the poll messages to when the repeater devices return the communication link 114 to the idle state. Therefore, the use of repeater devices to electrically buffer the poll messages 180 introduces some delay into when the control devices on the link are operable to begin transmitting digital messages. The repeater period after the standard poll message 180 is provided to allow for this delay, i.e., for the repeater devices to return the communication link 114 to the idle state. Repeater devices are described in greater detail in commonly-assigned U.S. Provisional Patent Application Ser. No. 60/874,166, filed Dec. 11, 2006, entitled LOAD CONTROL SYSTEM HAVING A PLURALITY OF REPEATER DEVICES, the entire disclosure of which is hereby incorporated by reference.

The HPR time period, also having a length of two byte-times, immediately follows the repeater time period. During the HPR time period, any control devices that have high-priority events to report are operable to transmit an HPR break character on the communication link 114. If an HPR break character is transmitted, the polled control device does not respond to the standard poll message 180. Therefore, the control device to which the standard poll message 180 was transmitted is operable to transmit the response 185 only if no control devices transmit an HPR break character during the HPR time period.

If no control devices transmit an HPR break character during the HPR time period, the responding control device is operable to begin transmitting the response 185 beginning during a two-byte response time period. The response 185 has a variable length. For example, a simple "I'm Here" response may comprise only two bytes R1, R2 as shown in FIG. 3A, while a status or other response may comprise a greater number of bytes.

Figure 3B:
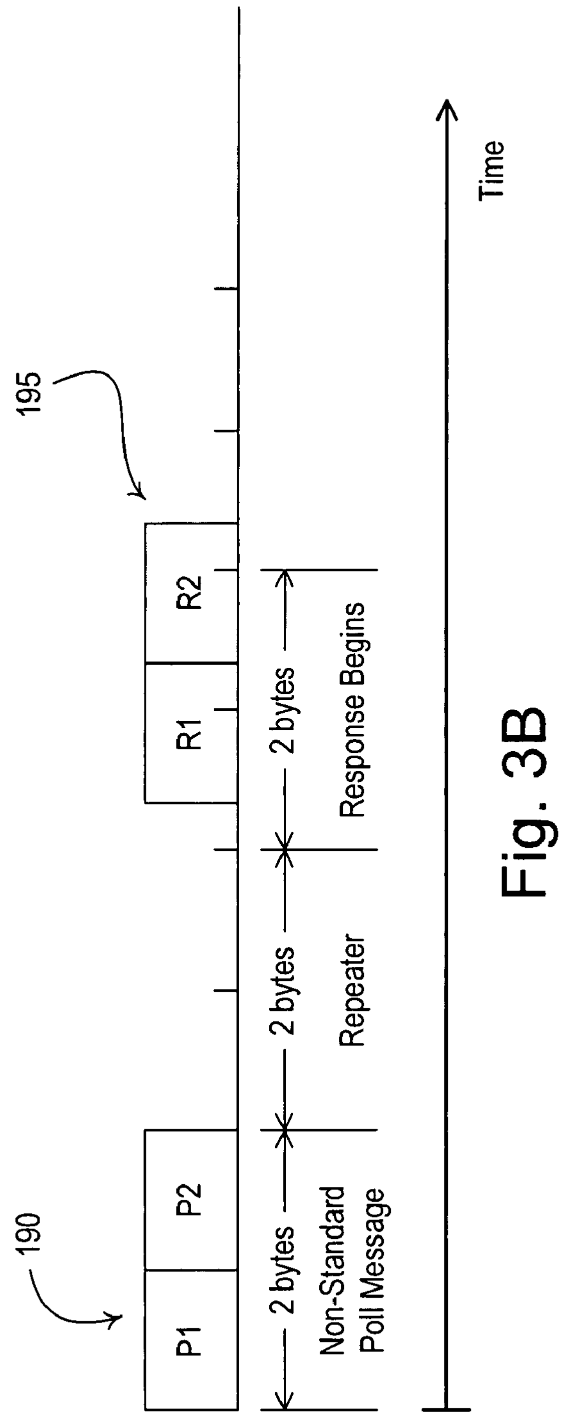
FIG. 3B is a timing diagram of a non-standard poll message transmitted by the master device of the load control system of FIG. 1 and a response to the non-standard poll message according to the novel protocol of the present invention.

FIG. 3B is a timing diagram of a non-standard poll message 190 transmitted by the master device and a response 195 to the non-standard poll message according to the novel protocol of the present invention. For example, the non-standard poll message 190 may be transmitted from the master device to a control device to allow the control device to transmit a high-priority message or to request a Poll ID. The non-standard poll message may comprise two bytes (as shown in FIG. 3B) or greater than two bytes (e.g., if the non-standard poll message includes the serial number of the control device to which the poll message is being transmitted). There is a repeater period between when the non-standard poll message 190 ends and the control device is operable to begin transmitting the response 195. There is no HPR time period. Because there is no HPR time period following the non-standard poll message 190, the control devices are not able to transmit an HPR break character to report a high-priority event after a non-standard poll message. In other words, no control device can prevent the transmission of a response to a non-standard poll message.

FIG. 4 is a flowchart of a polling procedure 200, which is executed by the controller 150 of the master device of the communication link 114. To begin, the master device transmits a poll message to the present slave device at step 210. For example, the first time that step 210 is executed, the master device transmits the poll message to the first control device, i.e., the control device having the Poll ID of zero. If the master device detects at step 212 that a control device has transmitted an HPR break character during the predetermined HPR time period to indicate that the control device has a high-priority message to transmit, the master device saves the Poll ID of the present control device (to which the poll message was transmitted at step 210) in the memory 162 at step 214.

Figure 5A:
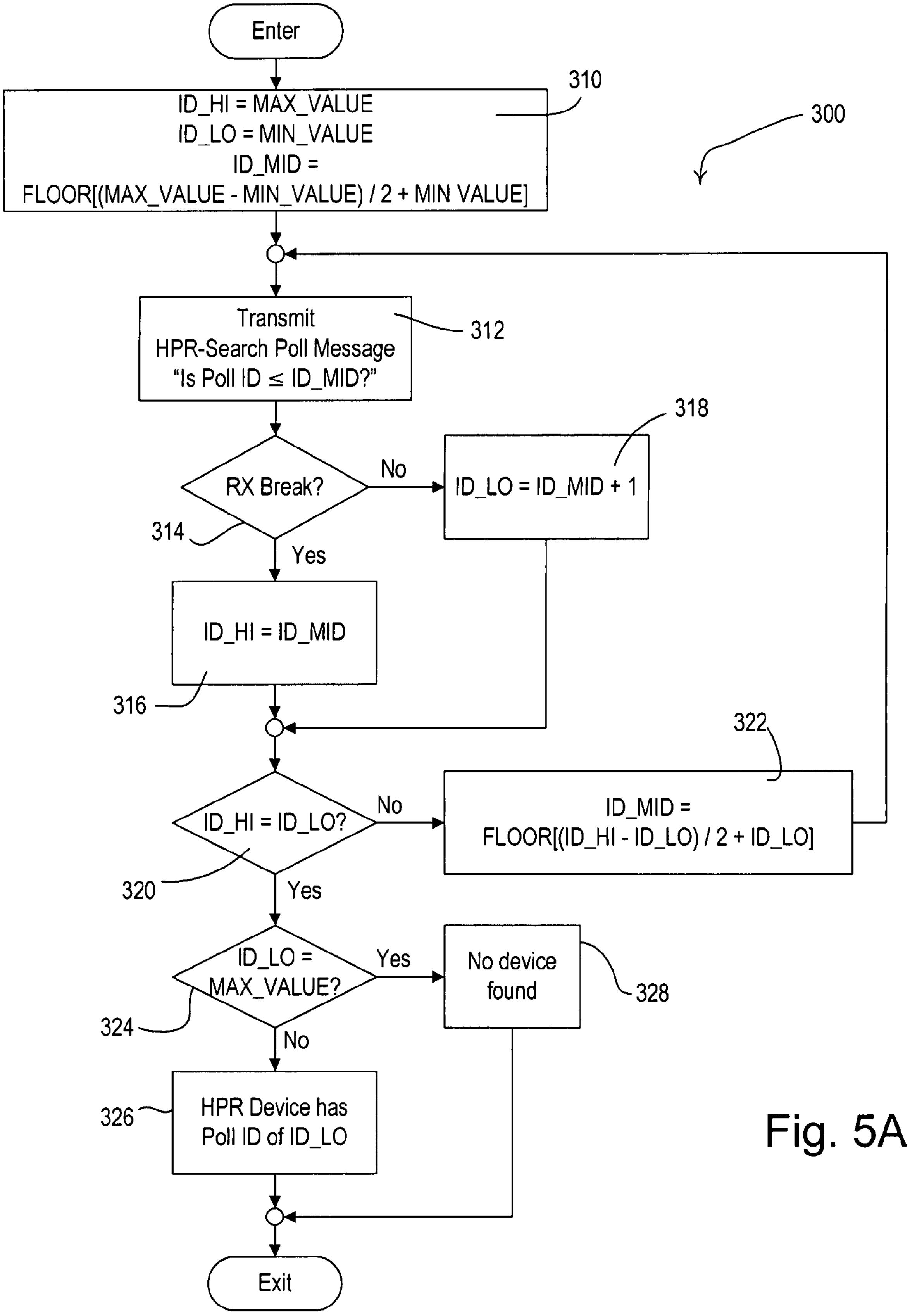
FIG. 5A is a flowchart of a high-priority request (HPR) binary search routine called by the polling procedure of FIG. 4.

Next, the master device determines the Poll ID of the control devices that transmitted the HPR break characters using the HPR binary search routine 300. FIG. 5A is a flowchart of the HPR binary search routine 300. The controller 150 is operable to search for the Poll ID from a minimum search value MIN_VALUE to a maximum search value MAX_VALUE. The binary search routine 300 repeatedly narrows the searching range (which ranges from the minimum range value ID_LO to the maximum range value ID_HI) until the minimum range value ID_LO equals the maximum range value ID_HI. A range midpoint value ID_MID represents the midpoint of the search range. When the HPR binary search routine 300 is called, the master device searches across the range of valid Poll IDs. Since the communication link 114 may have, for example, up to 100 control devices, the HPR binary search routine 300 uses a value of zero (0) for the minimum search value MIN_VALUE and a value of 100 for the maximum search value MAX_VALUE. The maximum search value MAX_VALUE is one more than the maximum possible Poll ID (i.e., a Poll ID of 99). The controller 150 is operable to determine that no control devices are left to be found by the HPR search routine 300 or that the HPR break character was transmitted by mistake of the value 100 is found by the HPR search routine.

At step 310, the controller 150 initializes the values of the minimum range value ID_LO to the minimum search value MIN_VALUE, the maximum range value ID_HI to the maximum search value MAX_VALUE, and the midpoint value ID_MID to the midpoint of the search range, i.e., $$\text{ID\_MID}=\text{FLOOR}[(\text{MAX\_VALUE}-\text{MIN\_VALUE})/2+\text{MAX\_VALUE}]. \quad \text{(Equation 1)}$$

The function FLOOR returns the next lowest integer (i.e., rounds down), e.g., FLOOR(4.5)=4. At step 312, the master device transmits an HPR-Search poll message to the control devices on the communication link 114. The HPR-Search poll message is a non-standard poll message (as shown in FIG. 3B), which essentially asks of the receiving control devices "Is your Poll ID less than or equal to the midpoint value ID_MID?" In response to the HPR-Search poll message, the control devices that have a high-priority event to report and have a Poll ID less than or equal to the midpoint value ID_MID transmit a search break character. If the master device receives a search break character at step 314, there is a control device having a high priority event that has a Poll ID less than or equal to the midpoint value ID_MID, so the search range is narrowed by setting maximum range value ID_HI to the midpoint value ID_MID at step 316. If there is no response to the HPR-Search poll message (i.e., no search break character is transmitted), the minimum range value ID_LO is set equal to the midpoint value ID_MID plus one at step 318 to narrow the search range.

If the maximum range value ID_HI is not equal to the minimum range value ID_LO at step 320, the search is not complete. The midpoint value ID_MID is set equal to the midpoint of the new search range, i.e., $$\text{ID\_MID}=\text{FLOOR}[(\text{ID}_{\text{—}HI\text{-}ID\text{—}LO})/2+\text{ID\_LO}], \quad \text{(Equation 2)}$$

at step 322 and the HPR binary search routine 300 loops to transmit another HPR-Search poll message to the narrowed range of the control devices at step 312. If the maximum range value ID_HI is equal to the minimum range value ID_LO at step 320 (i.e., the search is complete) and the minimum range value ID_LO is not equal to the maximum search value MAX_VALUE at step 324, the controller 150 has found a control device that has a high-priority event to report. Accordingly, the controller 150 stores the minimum range value ID_LO in memory at step 326 since the control device having the Poll ID equal to the value of the minimum range value ID_LO has a high-priority event to report, and the HPR binary search routine 300 exits. If the minimum range value ID_LO is equal to the maximum search value MAX_VALUE at step 324, the controller 150 determines that no device was found by the HPR binary search routine 300 at step 328. Even though a binary search is preferably used by the polling procedure 200 to locate the control devices that transmitted HPR break characters, those skilled in the art will appreciate that other searching procedures could be used to locate the control devices.

Referring back to FIG. 4, if the master device has found a control device that has a high-priority event to report at step 216 using the HPR binary search routine 300, the master device transmits a Report-HPR poll message (i.e., a non-standard poll message) to the located control device at step 218. Accordingly, the found control device transmits the high-priority event in response to the Report-HPR poll message. The polling procedure 200 continues to search for control devices having high-priority events to report by executing the HPR binary search routine 300 and subsequently transmitting Report-HPR poll messages to the found control devices at step 218 until the HPR binary search routine 300 finds no more devices having a high-priority event to report at step 216.

In order to prevent a single control device from monopolizing the bandwidth of the communication link 114 (e.g., if a user is repeatedly pressing a button on a keypad), a control device that just transmitted a high-priority message will not report a high-priority event again until normal polling continues. At that time, the control device is operable to once again transmit an HPR break character to report the high-priority event. This anti-bandwidth-monopolization provision of the protocol is described in greater detail with reference to the message processing procedure 400 of FIGS. 6A, 6B, and 6C.

When all control devices having high-priority events to transmit have been found, the master device resumes polling the communication link 114 with the Poll ID of the slave device that the poll message transmitted to before processing the high-priority request. Specifically, at step 220, the controller 150 retrieves the stored device from the memory (i.e., the present device that was stored in memory at step 214) and transmits a poll message to this control device at step 210.

If the master device does not detect an HPR break character at step 212 before the end of the HPR period at step 221, a determination is made at step 222 as to whether the master device has received a response to the poll message that was transmitted at step 210. If so, the master device determines whether the response is a "good response" at step 224, i.e., the master device determines whether the received message has a correct message length and a valid checksum. If a specific control device transmits a predetermined number of consecutive, incoherent messages to the master device (e.g., ten incoherent messages), the master device changes the status of the device to "missing-in-action" (MIA), i.e., ceases to transmit polling messages to the control device during the polling procedure 200. Specifically, if the response is not a good response at step 224, the master device increments a strike counter for the control device at step 226. The master device maintains a unique strike counter for each slave device on the communication link 114. If the strike counter for the present control device has exceeded the predetermined number, e.g., ten, at step 228, the master device changes the status of the control device to MIA at step 230 and transmits a Drop-ID message at step 231 to the control device that is missing-in-action. If a control device receives the Drop-ID message and has the Drop-ID message included in the Poll ID, the control device drops the present Poll ID and is thus ready to request and receive a new Poll ID. If the master device determines that the response is a good response at step 224, the master device clears the strike counter for the control device at step 232.

Figure 5B:
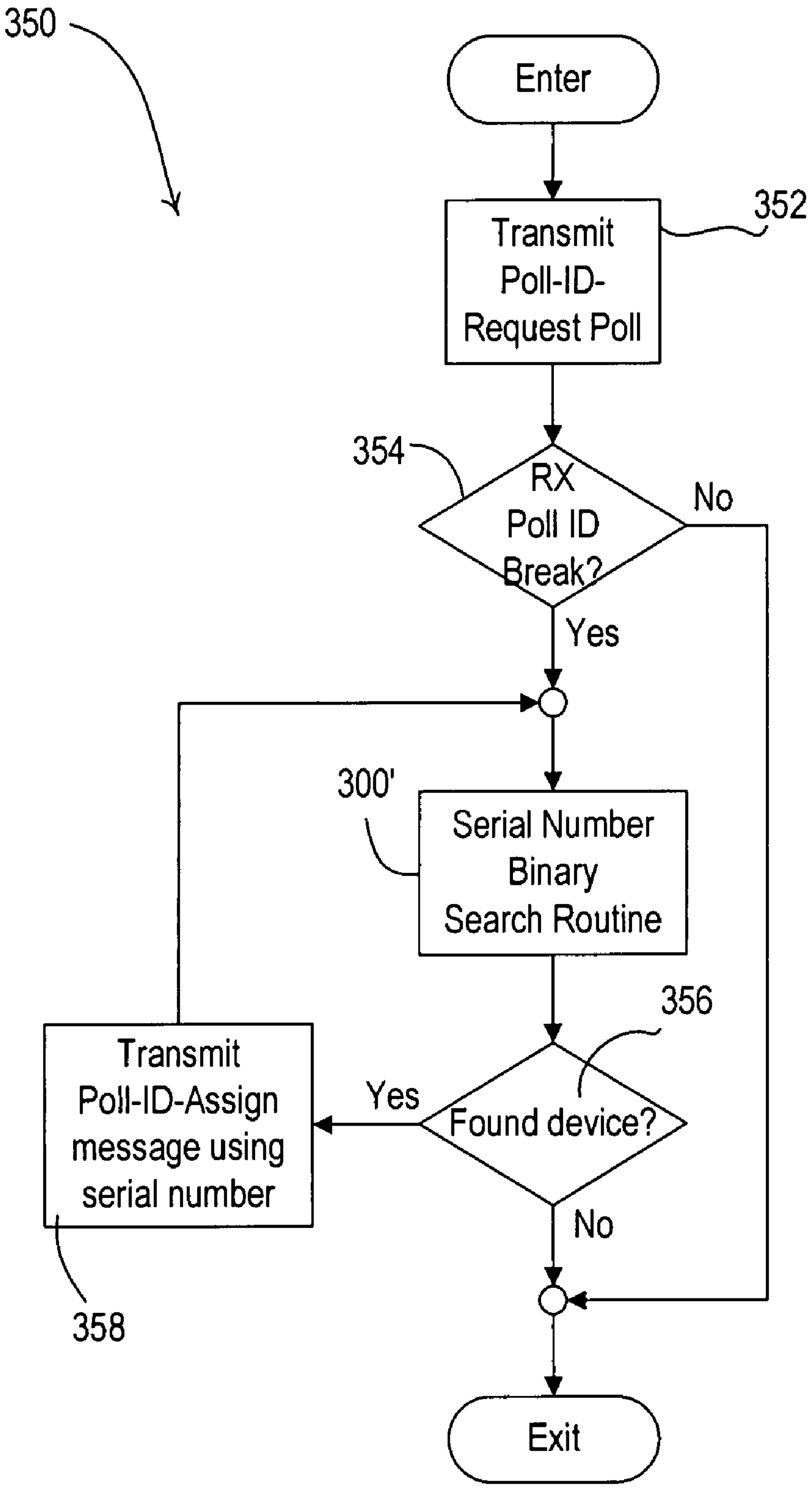
FIG. 5B is a flowchart of a Poll-ID-request routine called by the polling procedure of FIG. 4.

The master device periodically, e.g., every ten polling rounds, allows any control devices that do not have a Poll ID to request a Poll ID. If the master device has polled all devices ten times at step 234, the master device executes a Poll-ID-Request routine 350, which is shown in FIG. 5B. To begin, the master device broadcasts a Poll-ID-Request poll message to all control device coupled to the communication link 114 at step 352. A control device that does not have a Poll ID responds to the Poll-ID-Request poll message by transmitting a Poll ID break character during the response time following the Poll-ID-Request poll message.

If the master device receives a Poll ID break character at step 354, the master device executes a serial number binary search routine 300' to determine the control device(s) that require a Poll ID. The serial number binary search routine

Figure 5C:
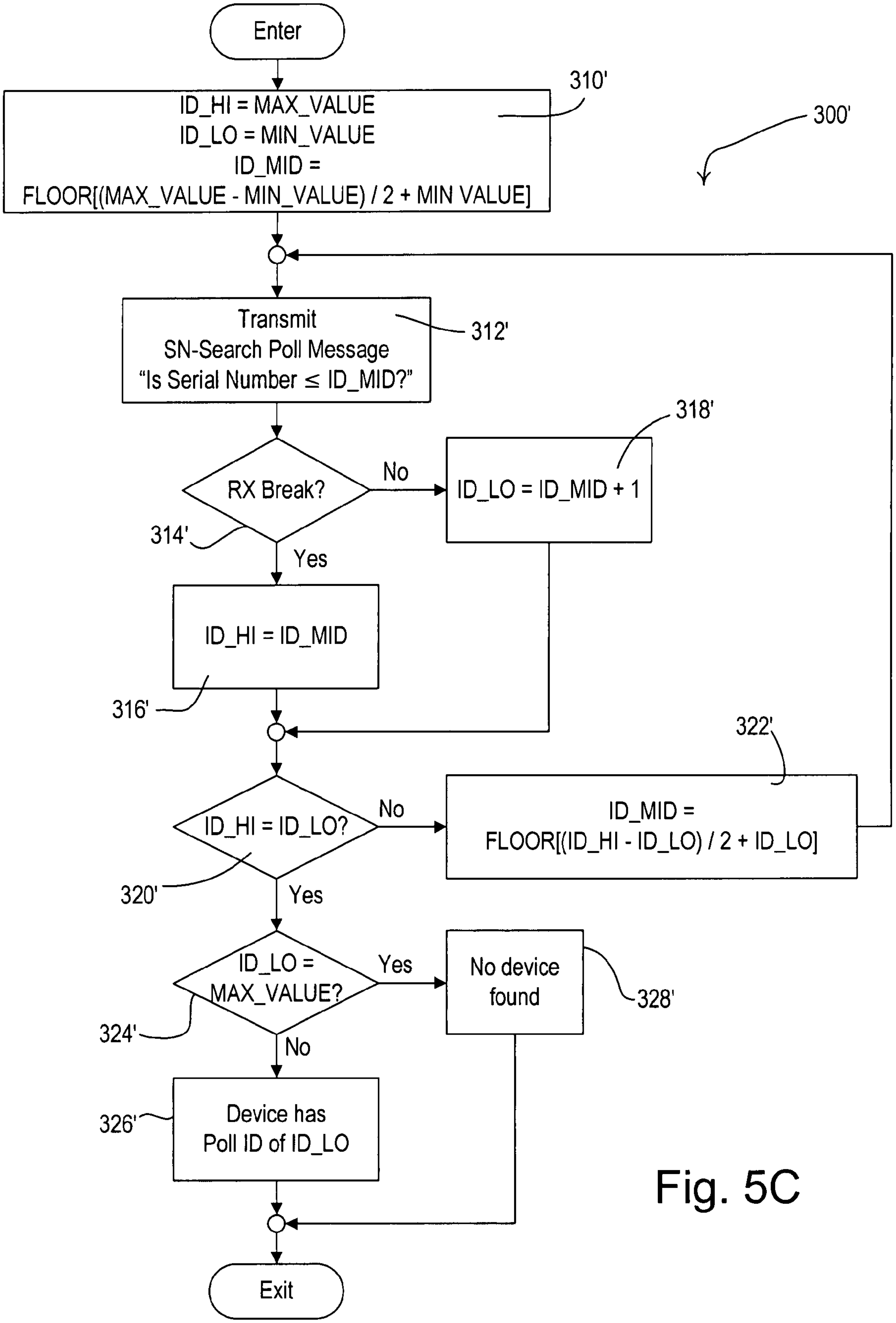
FIG. 5C is a flowchart of a Poll ID binary search routine called by the Poll-ID-request routine of FIG. 5B.

300' is shown in FIG. 5C and is very similar to the HPR binary search routine 300 of FIG. 5A. However, when the serial number binary search routine 300' is called, i.e., for the purpose of assigning a control device a Poll ID, the master device searches for the serial numbers of the control devices that do not have a Poll ID. Therefore, the minimum search value MIN_VALUE has a value of zero (0) and the maximum search value MAX_VALUE has a value of $2^{32}$, since the serial numbers have 32 bits. Further, at step 312' of the serial number binary search routine 300', the master device transmits a Serial-Number-Search ("SN-search") poll message, which is a non-standard poll message containing the message "Is your serial number less than the midpoint value ID_MID?" Since the serial numbers are longer than the one-byte Poll IDs and therefore the search domain is larger, the serial number binary search routine 300' typically requires a greater amount of time to execute than the HPR binary search routine 300.

If the master device finds a control device that requires a Poll ID at step 356, the master device transmits to the found control device at step 358 a Poll-ID-Assign message, which includes the first available Poll ID, using the serial number of the control device. The master device continues to assign Poll IDs at step 358 until the Poll ID binary search routine 300' does not locate any devices that require a Poll ID at step 356. If the master device does not receive a Poll ID break character at step 354 or if the master device does not find any more control devices that require a Poll ID at step 356, the Poll-ID-request routine 350 exits.

Referring back to FIG. 4, after executing the Poll-ID-request routine 350, the master device then switches to the next device at step 236 and transmits a poll message to this device at step 210. If the master device is not at the end of the $10^{th}$ polling round at step 234, the master device simply changes to the next device at step 236 and transmits another poll message at step 210. If the master device does not receive at step 222 a response to the poll message that was transmitted at step 210, the master device listens for a response until the end of the response period at step 238, at which time the master device increments the strike counter for the control device that did not respond at step 226.

Figure 6A:
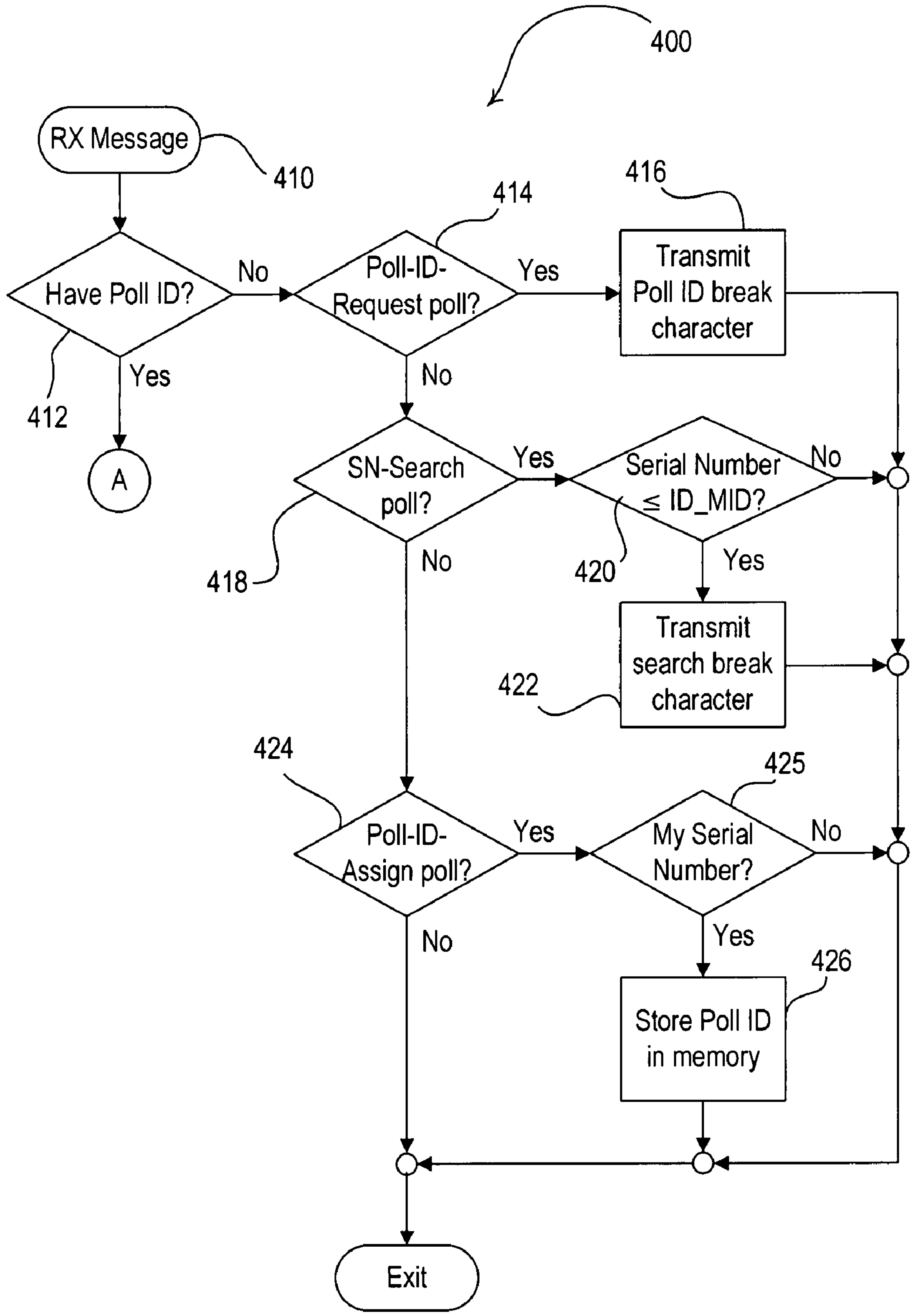
Figure 6C:
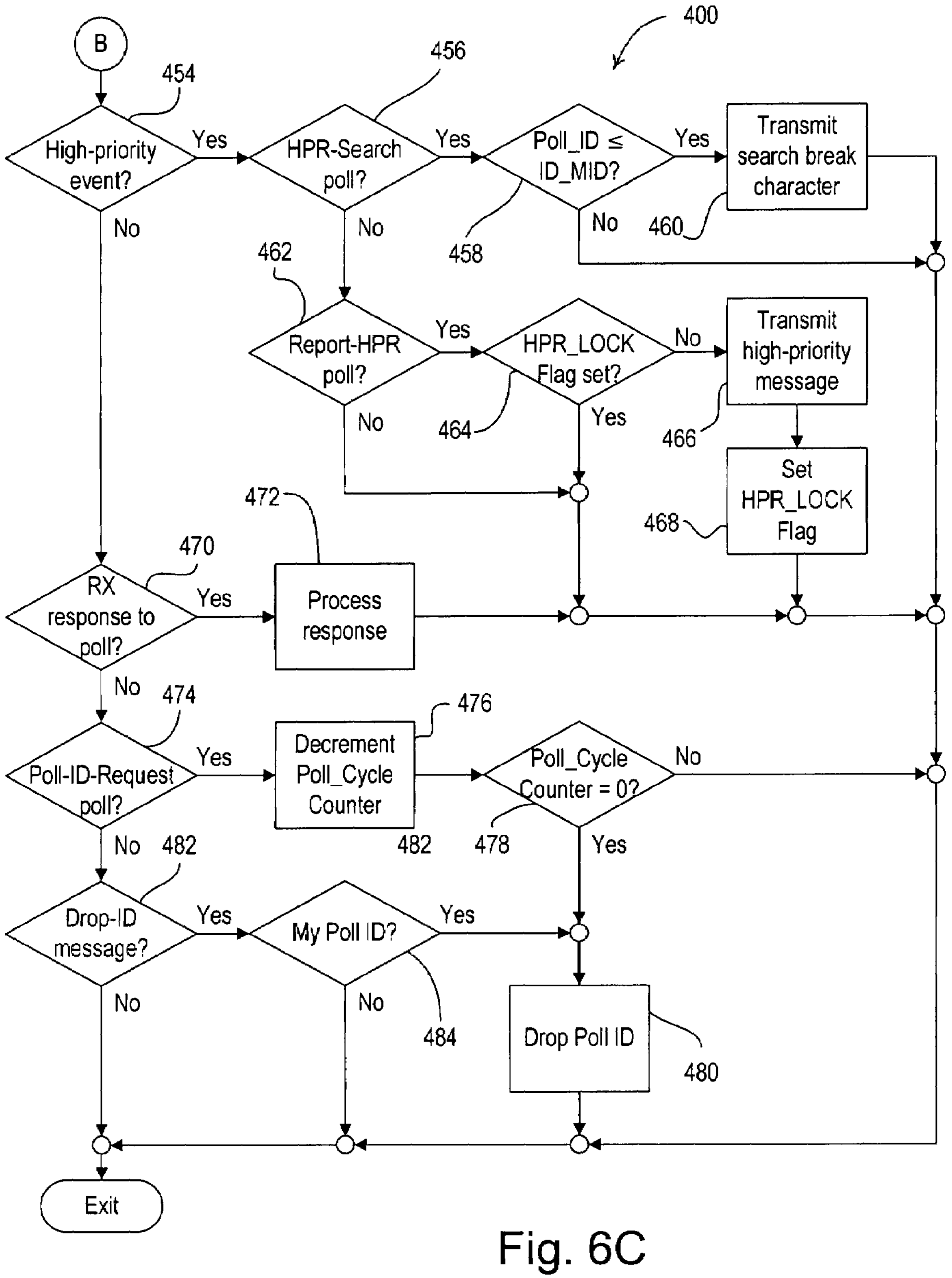

FIGS. 6A, 6B, and 6C are flowcharts of the message processing procedure 400 according to the present invention. The message processing procedure 400 is executed by the controller 150 of each of the control devices on the communication link 114 (including the master device) each time a message is received at step 410. Referring to FIG. 6A, if the control device does not have a Poll ID at step 412, the control device operates to acquire a new Poll ID from the master device. If the control device receives at step 414 a Poll-ID-Request poll message transmitted by the master device, the control device transmits a Poll ID break character on the communication link 114 at step 416 in a predetermined time period following the end of the Poll-ID-Request poll message.

Since multiple control devices may have transmitted a Poll ID break character at step 416, the master device executes the serial number binary search routine 300' to locate the control devices that require a Poll ID. If the control device has received an SN-Search poll message at step 418, a determination is made at step 420 as to whether the serial number of the control device is less than or equal to the midpoint value ID_MID. If not, the procedure 400 simply exits. Otherwise, the control device transmits a search break character at step 422 and the procedure 400 exits. The master device uses the transmission of the search break character at step 422 to narrow the searching range of the serial number binary search routine 300'. When the master device narrows the search to one control device, the master device transmits a Poll-ID-Assign poll message to the found control device. If the control device receives a Poll-ID-Assign poll message at step 424 and the serial number contained in the Poll-ID-Assign poll message is the serial number of the control device at step 425, the control device stores the Poll ID included in the poll message in memory at step 426 and the procedure 400 exits. If the control device does not receive a Poll-ID-Assign poll message at step 424 or if the serial number contained in the Poll-ID-Assign poll message is not the serial number of the control device at step 425, the procedure 400 simply exits.

Referring to FIG. 6B, if the control device has a Poll ID at step 412, a determination is made as to whether the control device has received a standard poll message at step 428. The control device uses an HPR_LOCK flag to keep track of whether the control device has reported a high-priority event since the last standard poll message that was received. The use of the HPR_LOCK flag prevents the control device from monopolizing the bandwidth of the communication link 114 if the control device has more than one high-priority event to report. If the control device has received a standard poll message at step 428, the control device clears the HPR_LOCK flag at step 430.

If the received poll message does not include the Poll ID of the polled control device at step 432, a determination is made at step 434 as to whether the control device has a high-priority event to report. If the control device was not polled at step 432 and has a high-priority event to report at step 434, the control device waits at step 435 for two-byte times after the end of the received standard poll message, i.e., until the start of the HPR time period. During the HPR time period, the control device transmits an HPR break character on the communication link 114 at step 436. Alternatively, if the received poll message includes the Poll ID of the control device and the control device has a high-priority event to report, but the control device does not receive an HPR break during the HPR time period, the control device simply transmits the high-priority message as a response to the standard poll message received at step 428 as will be described in greater detail below. Further, if the received poll message includes the Poll ID of the control device, the control device has a high-priority event to report, and the control device receives an HPR break during the HPR time period, the polled control device does not transmit the high-priority message as a response to the poll message, but instead responds to the HPR search routine 300 executed by the master control.

If the control device does not receive, for a predetermined number of received standard poll messages, a standard poll message that includes the Poll ID of the control device, i.e., the master device is not polling the control device, the control device is operable to drop the Poll ID and obtain a new Poll ID. Specifically, if the control device receives a predetermined number of Poll-ID-Request poll messages (which are transmitted after every $10^{th}$ polling round), e.g., two (2) Poll-ID-Request poll messages, the control device will drop its Poll ID. The control device uses a Poll_Cycle counter to keep track of how many Poll-ID-Request poll messages have been transmitted since the control device was last polled.

Specifically, if the received poll message includes the Poll ID of the control device at step 430, the control device sets the Poll_Cycle counter equal to two (2) at step 438 and waits for two byte-times at step 440 until the HPR time period begins. The control device listens for an HPR break character during the HPR period at step 442 until the end of the HPR period arrives at step 444. If the control device hears an HPR break character at step 442, the control device exits the procedure 400 without responding to the poll message. If the control device has a high-priority event to report at step 442, the control device subsequently joins in to the HPR search routine 300 executed by the master control.

In order to determine if any other control devices on the communication link 114 have the same Poll ID, the control device periodically listens for transmissions on the communication link rather than transmitting a response to a received standard poll message during the time period that the control device is operable to begin transmitting the response. The control device preferably chooses at random not to respond to one of the standard poll messages in the range of the $16^{th}$ through $32^{nd}$ standard poll message. If the control device does not hear an HPR break character at step 442 before the end of the HPR period at step 44, a determination is made at step 445 as to whether the control device should execute the random non-response to the standard poll message, i.e., to listen to the communication link 114 rather than responding to the standard poll message. If so, the control device listens for a response to the standard poll message from another control device at step 446. If the control device hears a response at step 446, the control device drops the present Poll ID at step 448 and eventually obtains another Poll ID through the Poll-ID-Request routine 350. If the control device should not listen on the communication link 114 at step 445 and the control device has a high-priority event to report at step 450, the control device transmits the high-priority event at step 451 and the procedure 400 exits. If the control device does not have a high-priority event to report at step 450, the control device transmits at step 452 a response to the standard poll message received at step 428.

If the control device has not received a standard poll message at step 428, the control device operates to process non-standard poll messages, i.e., responses to poll messages, HPR-Search poll messages, Link-ID-Request poll messages, etc. as shown in FIG. 6C.

In response to receiving the HPR break character transmitted at step 436, the master device executes the HPR binary search routine 300 to locate the control devices that have high-priority events to report. Specifically, if the control device has a high-priority event to report at step 454 and if the control device receives the HPR-Search poll message at step 456, a determination is made at step 458 as to whether the Poll ID of the control device is less than or equal to the midpoint value ID_MID. If the Poll ID of the receiving control device is within the search range of the HPR binary search routine 300, the control device transmits a search break character on the communication link at step 460.

When the master device determines the Poll ID of a control device that has a high-priority event to report, the master device transmits a Report-HPR poll message to the control device. If the control device receives a Report-HPR message at step 462 and the HPR_LOCK flag is not set at step 464, the control device transmits the high-priority event to the control devices on the communication link 114 at step 466. The control device then sets the HPR_LOCK flag at step 468, such that the control device is not able to transmit another high-priority event until normal polling begins again.

If the control device does not have a high-priority event to report at step 454, but has received at step 470 a response to a standard or non-standard poll message, the control device appropriately processes the response at step 472. For example, if a user actuated a button on one of the keypads 120, the keypad 120 may transmit a high-priority message corresponding to the selection of a first lighting preset. When the control device receives the high-priority message at step 470, the control device may be responsive to the first lighting preset at step 472, e.g., the control device may illuminate an LED or control a lighting load 104 in accordance with the first lighting preset. The processing of commands of a load control system is described in greater detail in the '728 patent.

If the control device has not received a response to a standard or non-standard poll message at step 470, but the control device has received a Poll-ID-Request poll message at step 474, the controller 150 decrements the variable Poll_Cycle counter by one at step 476. If the variable Poll_Cycle counter is equal to zero at step 478, the control device drops the Poll ID at step 480. Otherwise, the procedure 400 simply exits. If the control device has not received a Poll-ID-Request poll message at step 480, a determination is made at step 482 as to whether the received message is a Drop-ID message. If the control device received a Drop-ID message at step 482 and the Drop-ID message contains the Poll ID of the polled control device, the polled control device drops the present Poll ID at step 480 and the procedure 400 exits. If the control device did not receive a Drop-ID message at step 482 or if the Drop-ID message did not contain the Poll ID of the polled control device, the procedure 400 simply exits.

Figure 7:
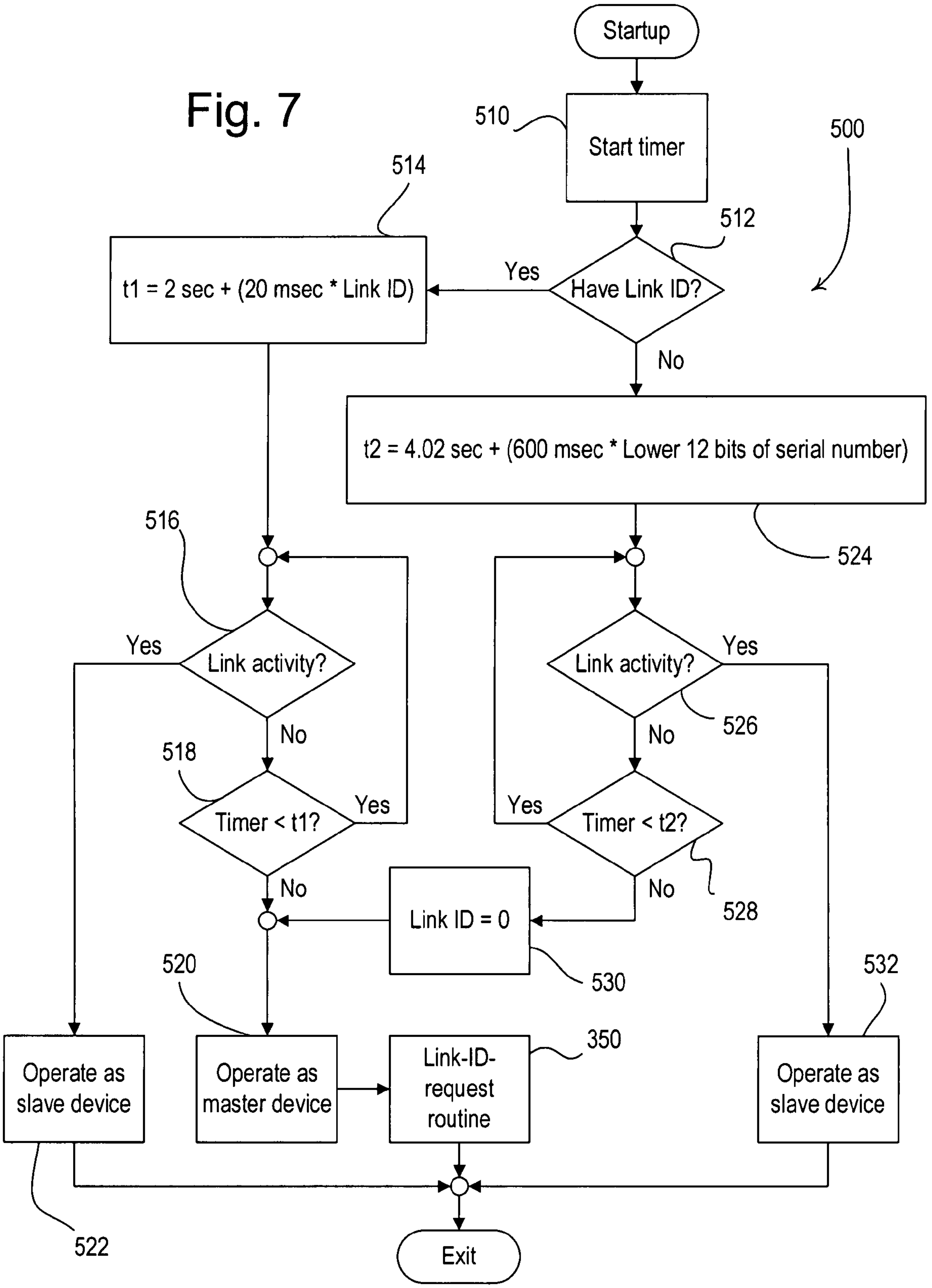
FIG. 7 is a flowchart of a startup procedure executed by each of the control devices of the load control system of FIG. 1 at startup.

FIG. 7 is a flowchart of a startup procedure 500, executed by the controller 150 of each control device at startup (i.e., power up). At step 510, the controller 150 starts a timer. If the control device has a Poll ID stored in the memory 162 at step 512, the controller 150 sets a first time $t_1$ at step 514, where $$t_1 = 2\text{ sec} + (20\text{ msec}\cdot\text{Poll ID}). \qquad \text{(Equation 3)}$$

Next, the control device listens for communication (i.e., link activity) on the communication link 114 at step 156 until the timer exceeds the first time $t_1$ at step 518. If the timer exceeds the first time $t_1$ at step 518, the control device begins to operate as the master device at step 520. Next, the control device executes the Poll-ID-Request routine 350 to allow other control devices on the communication link 114 to request a Poll ID, if needed. Then, the startup procedure 500 exits, at which time the control device operating as a master device begins executing the polling procedure 200. If the control device detects link activity at step 516, the control device simply operates as a slave device (i.e., not as the master device) at step 522 and the startup procedure 500 exits.

If the control device does not have a Poll ID stored in the memory 162 (or does not have a memory to store the Poll ID) at step 512, the controller sets a second time $t_2$ at step 524, such that $$t_2 = 4.02\text{ sec} + (600\text{ msec}\cdot SN_{LOW\text{-}12\text{-}BITS}), \qquad \text{(Equation 4)}$$

where $SN_{LOW\text{-}12\text{-}BITS}$ is the value of the lower 12 bits of the serial number of the control device. According to Equation 2, the second time $t_2$ is always greater than the first time $t_1$ to allow a control device having a Poll ID to become the master device before allowing a control device not having a Poll ID. The control device waits until link activity is detected at step 526 or the timer exceeds the second time $t_2$ at step 528, at which time the control device sets the Poll ID as zero (0) at step 530. The control device then begins operating as the master device at step 520 and executes the Poll-ID-Request routine 350. If the control device detects communication on the communication link 114 at step 526, the control device operates as a slave device at step 532 and the startup procedure 500 exits.

The lighting control system 100 as shown in and described with reference to FIGS. 1-7 uses a polling technique in which a single master device handles the timing of the transmissions on the communication link 114. However, the concept of suspending regular-priority messages to expedite the handling high-priority messages can be applied to lighting control systems that derive the timing of the communications from other means.

According to a second embodiment of the present invention, the lighting control system 100 does not require a master device in order to allow for the transmission of regular-priority and high-priority messages between the control devices. Rather, each of the control devices of the lighting control system 100 according to the second embodiment is operable to begin transmitting a digital message during a unique predetermined time slot. Preferably, each control device comprises a timer and is operable to keep track of the present time slot.

Figure 8:
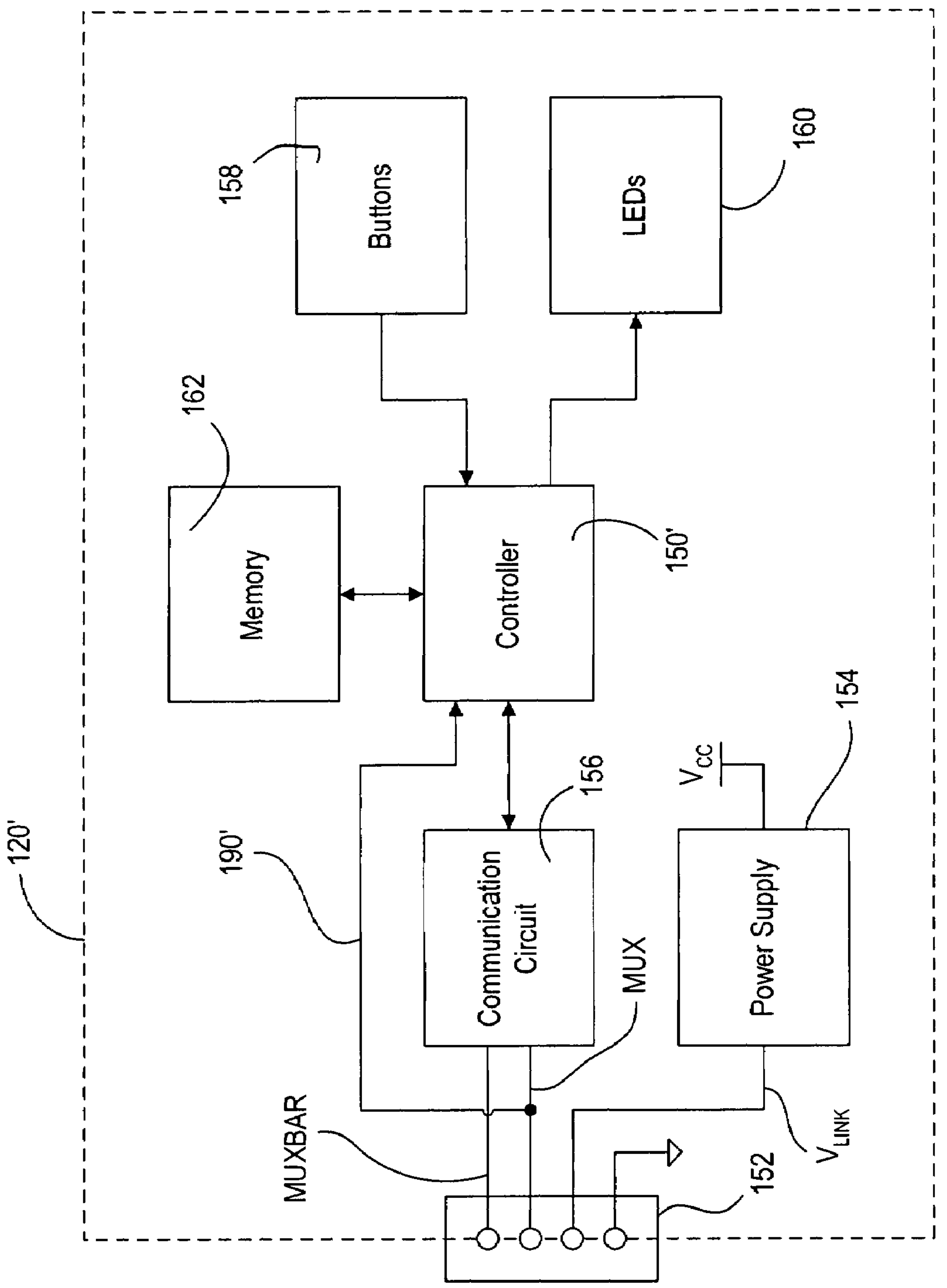
FIG. 8 is a simplified block diagram of a control device according to the second embodiment of the present invention.

FIG. 8 is a simplified block diagram of a control device, e.g., a keypad 120', according to the second embodiment of the present invention. The keypad 120' is identical to the keypad 120 shown in FIG. 2 except that the keypad 120' includes a direct timing connection 190' between the MUX data wire of the communication link 114 and a controller 150'. The controller 150' includes a timer, which the controller employs to determine when to transmit the digital messages on the communication link 114. The controller 150' uses the signal received via the direct timing connection 190' to synchronize the timer with the timers of the other control devices coupled to the communication link 114. Specifically, the controller 150' synchronizes the timer in relation to a rising edge of the last digital message transmitted on the communication link 114.

Figures 9A, 9B, 9C:
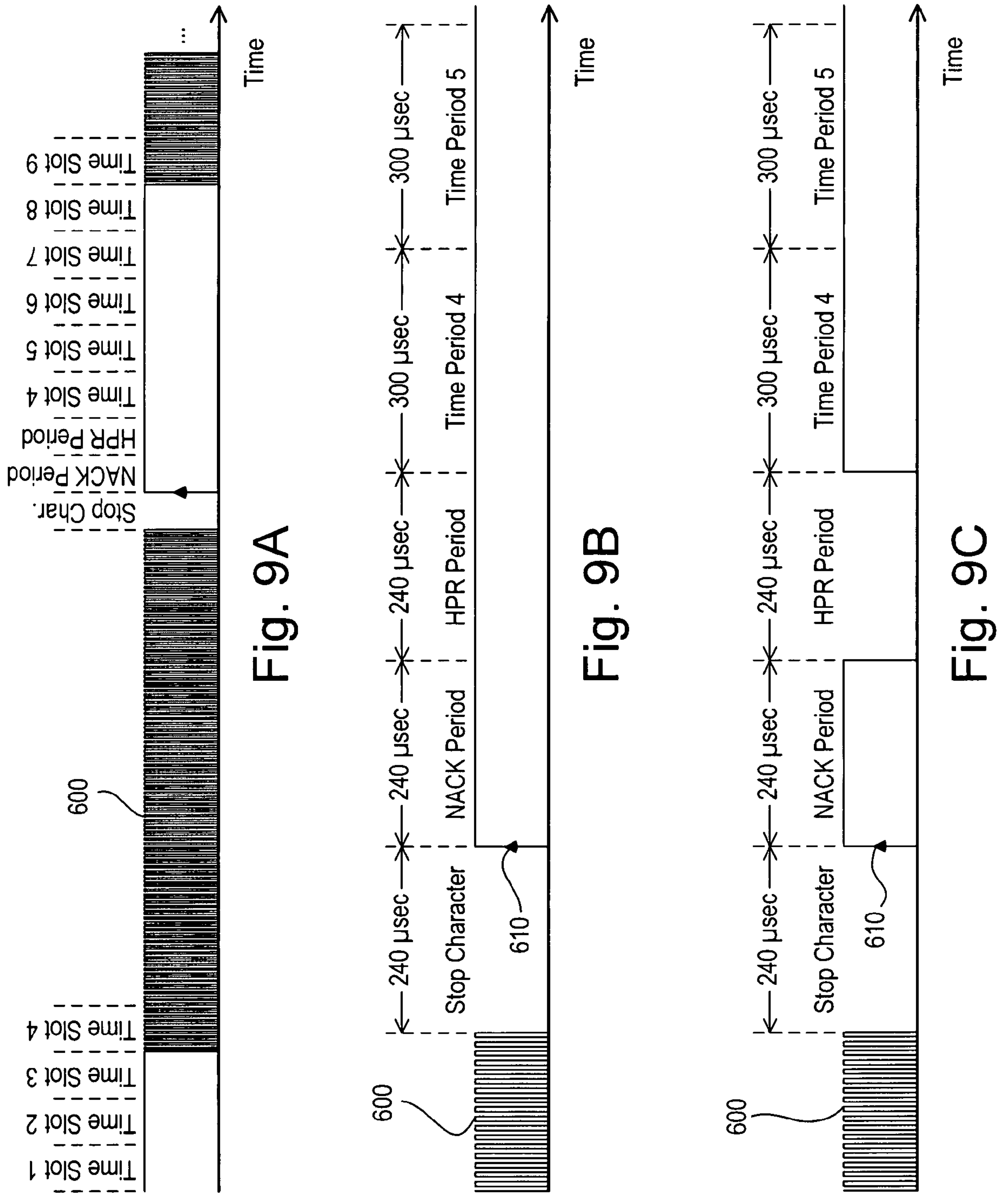
FIG. 9A is a timing diagram illustrating time slots and a digital message according to the second embodiment.
FIG. 9B is an enlarged timing diagram showing the end of the digital message and a number of time periods that follow the digital message.
FIG. 9C is an enlarged timing diagram showing the end of the digital message with one of the control devices transmitting a break character during the HPR period.

FIG. 9A is a timing diagram illustrating the time slots and a digital message 600 according to the second embodiment. As previously mentioned, each control device comprises a timer and keeps track of the present time slot. The time slots are each preferably 300 μsec in length. The time slots sequentially increase in order until the maximum time slot is reached (i.e., a timing cycle is complete). After a timing cycle is complete, the timing cycle starts over, i.e., the first time slot follows the maximum time slot. As shown in FIG. 9A, the control device of time slot 4 begins to transmit the digital message 600. The digital messages may comprise, for example, 20 to 30 bytes, and thus may have lengths from approximately 4 to 6 msec. Therefore, the time slots are much shorter than the digital messages.

FIG. 9B is an enlarged timing diagram showing the end of the digital message 600 and a number of time periods that follow the digital message: a stop character period, a NACK period, and an HPR period. During the stop character period, the transmitting device (i.e., the control device of time slot 4 as shown in FIG. 9A) pulls the communication link 114 low for 240 μsec. The stop character ends with a rising edge 610, which is used by all of the control devices on the communication link 114 to synchronize the timers of the control devices.

After the stop character is the NACK period (also 240 μsec in length), during which any of the control devices may "not acknowledge" (or "NACK") that the control device received a "good message", i.e., the control device experienced an error during the receipt of the digital message 600. For example, the control device may transmit a NACK character to report that the received digital message 600 has a bad checksum. To transmit a NACK character, the control devices preferably transmit a NACK break character during the NACK period. Following the HPR period, the time slot of the transmitting device is repeated to allow the transmitting device to re-transmit the last message if a NACK is detected during the NACK period.

Following the NACK period is the HPR period, which is also 240 μsec in length. The control devices are operable to report that the control devices have a high-priority event to transmit by transmitting HPR break characters during the HPR time. FIG. 9C is an enlarged timing diagram showing the end of the digital message 600 with one of the control devices transmitting an HPR break character during the HPR period. As with the first embodiment of the present invention, a plurality of control devices are operable to simultaneously transmit an HPR break character (i.e., a wired-OR condition).

Upon receipt of the HPR break character, the control devices on the communication link 114 are operable to enter a high-priority mode of operation, in which the control devices suspend the transmission of regular-priority digital messages for one timing cycle. Accordingly, the time slots pass without any control devices transmitting a regular-priority message until the time slot of a control device having a high-priority event to report arrives. Since the time slots are much shorter in length than the digital messages, the time slots pass quickly when the communication link 114 is in the high-priority mode of operation and the transmission of regular-priority digital messages is suspended. Thus, the time slot of a control device having a high-priority event to report is quickly reached in the high-priority mode. After a high-priority message is transmitted, any control devices that still have a high-priority event to transmit are operable to transmit an HPR break character during the HPR period.

Figure 10:
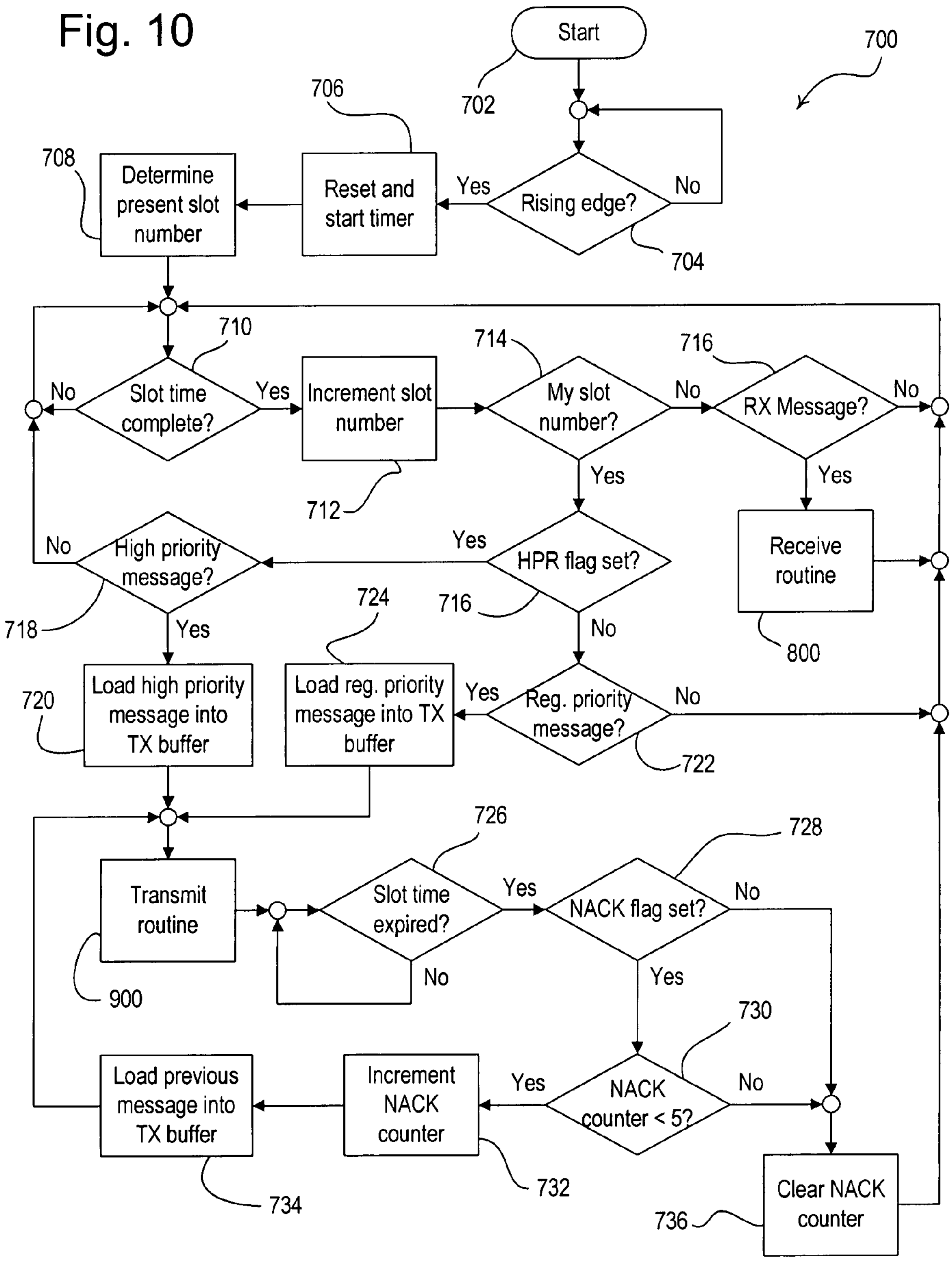
FIG. 10 is a flowchart of a timing procedure executed by a controller of the control device of FIG. 8 according to the second embodiment of the present invention.

FIG. 10 is a flowchart of a timing procedure 700 executed by the controller 150' of the control devices according to the second embodiment of the present invention. The controller 150' uses two flags to control the operation of the control device. Specifically, the controller 150' uses an HPR flag to record when a high-priority request is detected during the HPR time period and a NACK flag to record when a NACK character is received during the NACK time period.

The timing procedure begins at step 702, for example, at startup (i.e., power up) of the controller 150'. First, the controller 150' waits at step 704 to detect a rising edge of a stop character of a message transmitted on the communication link 114. When the controller 150' receives a digital message and detects a rising edge of a stop character at step 704, the controller resets and starts the timer at step 706 and determines the present slot number from the received digital message at step 708.

The controller 150' waits at step 710 until the present time slot is complete, i.e., 300 μsec have expired since the present time slot began. When the present time slot is complete at step 710, the controller 150' increments the present slot number at step 712, for example, from time slot 3 to time slot 4. At step 714, if the present time slot is not the time slot in which the controller 150' is operable to transmit a digital message, the controller 150' determines if a digital message has been received at step 716. If not, the timing procedure 700 loops around to wait for the end of the present time slot at step 710.

Figure 11:
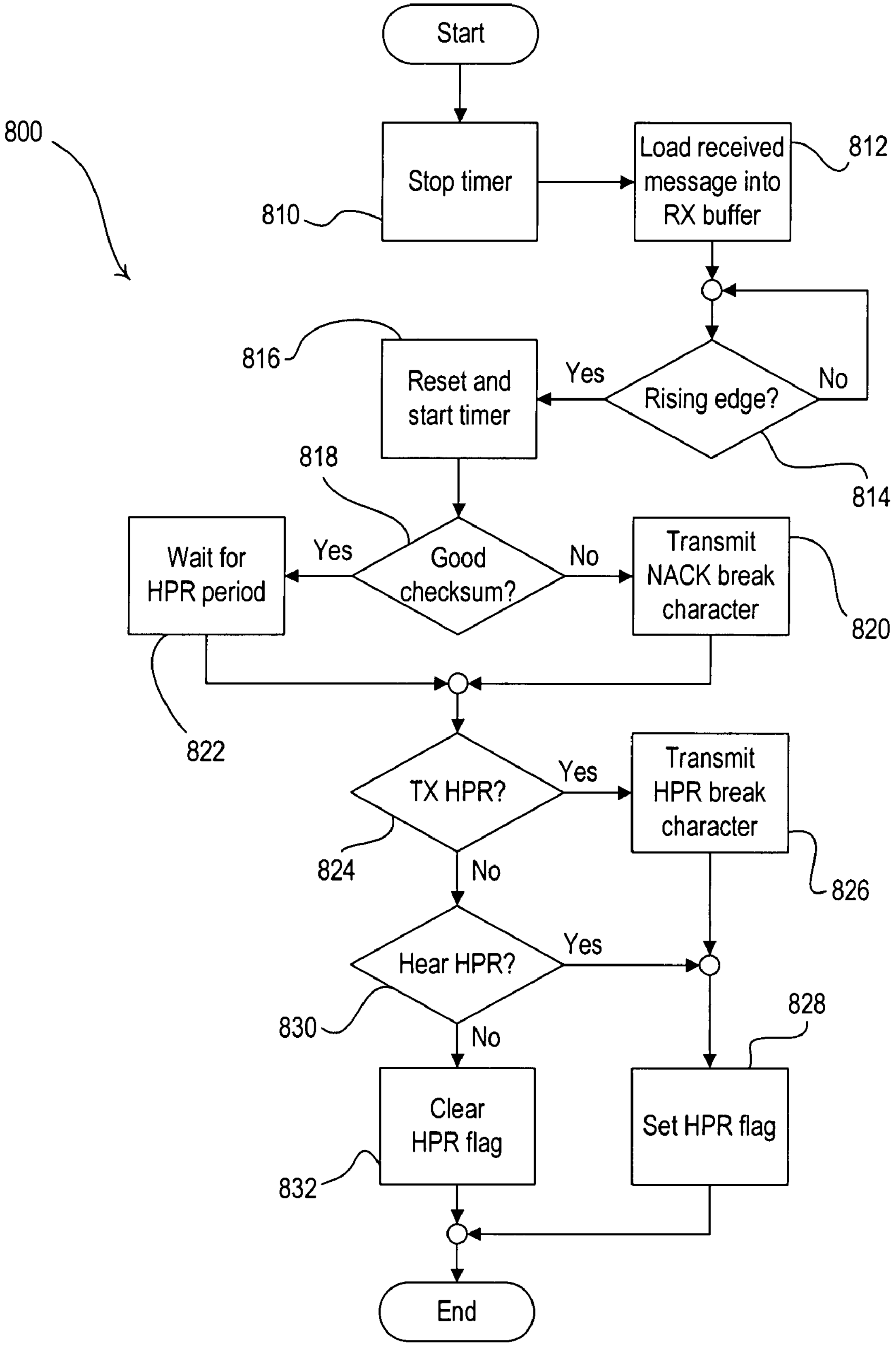
FIG. 11 is a flowchart of a receiving routine executed by the controller of the control device of FIG. 8.

If a digital message has been received at step 716, the controller 150' executes a receive (RX) routine 800. FIG. 11 is a flowchart of receive routine 800. Since the time slots do not continue to pass as the controller 150' is receiving a digital message, the timer is stopped at step 810. Next, the digital message that is received is loaded into a receive (RX) buffer at step 812 for the controller 150' to process. At step 814, the controller 150' waits for the rising edge at the end of the stop character that follows the received digital message. The controller 150' synchronizes the timer with the timers of the other control devices on the communication link 114 in response to the rising edge. Specifically, when the controller 150' receives the rising edge, the controller resets and then starts the timer at step 816.

If the received digital message does not contain a good checksum at step 818, the controller 150' transmits a NACK break character at step 820 during the NACK period at the end of the digital message to signal that the digital message should be re-transmitted. Otherwise, the controller 150' simply waits during the NACK period for the HPR period at step 822.

If the controller 150' has a high-priority message to transmit at step 824, the controller 150' transmits an HPR break character during the HPR period at step 826 and sets the HPR flag at step 828 before exiting the receive routine 800. If the controller 150' does not have a high-priority message at step 824, but the controller 150' detects an HPR break character during the HPR period at step 830, the controller 150' sets the HPR flag at step 826 and exits the receive routine 800. If the controller 150' does not detect an HPR break character at step 830, the controller 150' clears the HPR break flag at step 832 and the receive routine 800 exits. Referring back to FIG. 10, once the receive routine 800 has exited, the timing procedure 700 loops around, such that the controller 150' once again waits for the present time slot to end at step 710.

Figure 12:
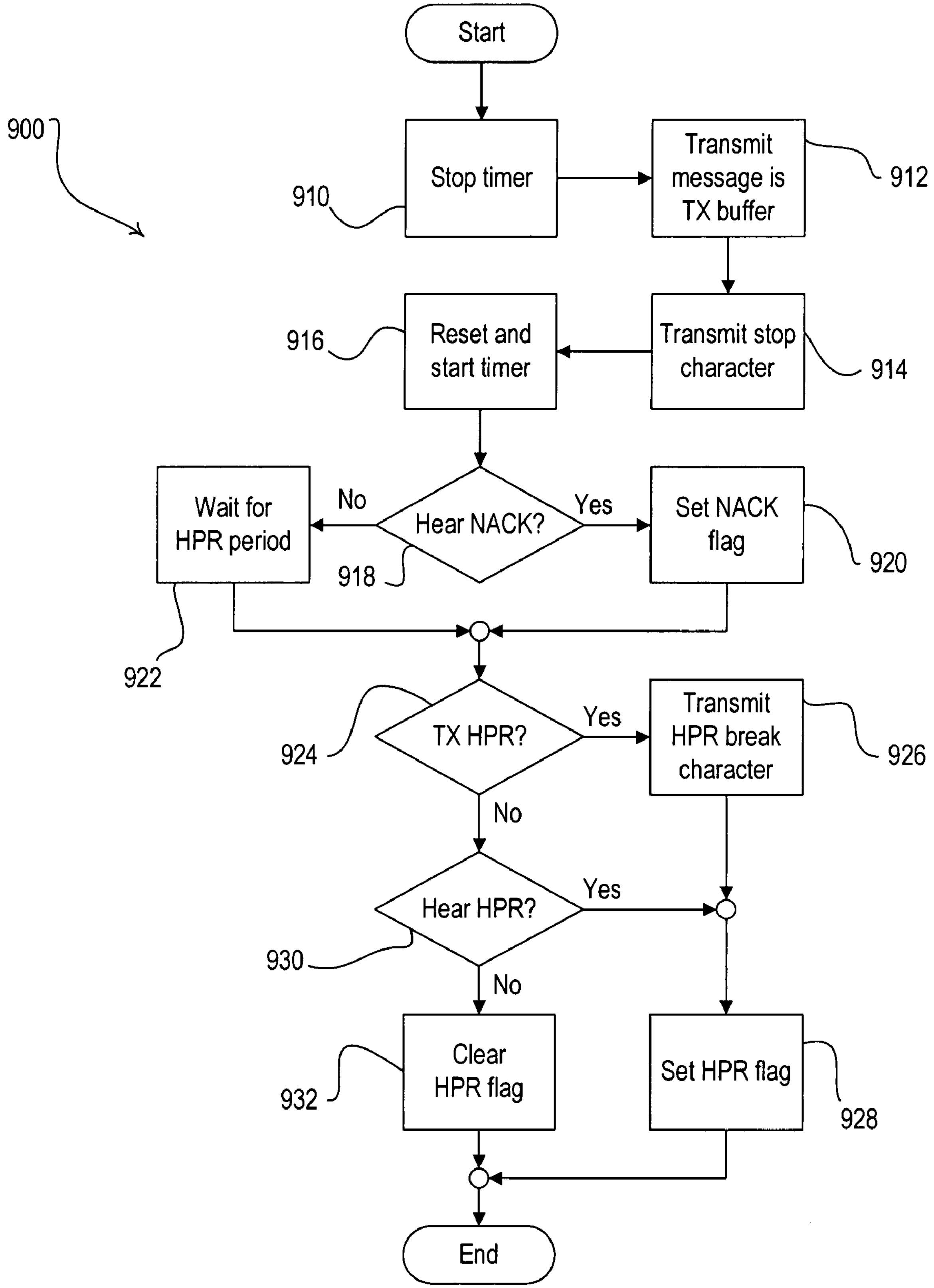
FIG. 12 is a flowchart of a transmitting routine executed by the controller of the control device of FIG. 8.

If the HPR flag is set at step 716, the communication link 114 is in the high-priority mode of operation and one of the control devices has a high-priority message to transmit. If the controller 150' has a high-priority message to transmit at step 718, the controller 150' loads the hig-priority message into a transmit (TX) buffer at step 720. The controller 150' then executes a transmit (TX) routine 900 (as shown in FIG. 12) to transmit the message in to the TX buffer on the communication link 114. If the HPR flag is not set at step 716, but the controller 150' has a regular-priority message to transmit at step 722, the controller 150' loads the regular-priority message into the TX buffer at step 724 and executes the transmit routine 900. If the controller 150' does not have a high-priority or a regular-priority message to transmit, the procedure 700 loops to wait for the present time slot to end at step 710.

FIG. 12 is a flowchart of the transmit routine 900. First, the timer is stopped at step 910 and the message that is in the TX buffer (i.e., the high-priority message or the regular-priority message) is transmitted to the other control devices on the communication link 114. Immediately following the end of the digital message, a stop character (i.e., a break character) is transmitted on the communication link 114 at step 914. Upon the rising edge at the end of the stop character, all of the control devices on the communication link 114 synchronize their timers. Thus, the timer of the present control device is started at step 916 with the rising edge of the stop character.

If the controller 150' detects a NACK break character on the communication link 114 at step 918, then at least one of the control devices on the communication link did not correctly receive the digital message transmitted at step 912. Accordingly, the controller 150' sets the NACK flag at step 920, such that the controller 150' is operable to re-transmit the digital message in the TX buffer. If the controller 150' does not receive a NACK break character at step 918, the controller simply waits for the HPR time period at step 922.

If the controller 150' has a high-priority message to transmit at step 924, the controller transmits an HPR break character on the communication link 114 at step 926 and sets the HPR flag at step 928. If the controller 150' does not have a high-priority message to transmit at step 924, but detects an HPR break character on the communication link 114 at step 930, the controller 150' sets the HPR flag at step 928. Otherwise, the controller 150' simply clears the HPR flag at step 932 and transmitting procedure 900 exits.

Referring back to FIG. 10, once the controller 150' has transmitted the high-priority or regular-priority digital message on the communication link 114 using the transmit procedure 900, the controller handles any NACKs that may have been received during the transmit procedure. The controller 150' uses a NACK counter to keep track of the number of times the controller has received a NACK in response to a specific digital message, and re-transmitted the specific message. The controller 150' only re-transmits a specific digital message a predetermined number of times, such as, for example, five (5) times, before normal communications begin again on the communication link 114.

After executing the transmit procedure 900, the controller 150' waits for the end of the present time period at step 726. If the NACK flag is set at step 728 and the NACK counter is less than five at step 730, the controller 150' increments the NACK counter at step 732. The controller 150' then loads the previous message into the TX buffer at step 734 and re-transmits the message using the transmit routine 900. If the NACK flag is not set at step 728 or the NACK counter is not less than five at step 730, the controller 150' clears the NACK counter at step 736 and the procedure 700 loops around to wait for the end of the present time slot at step 710.

While the protocol of the present invention has been described with reference to a wired communication link, the fundamentals of the method of the present invention could also be applied to another type of communication link including a wireless communication link, such as, for example, a radio-frequency (RF) or an infrared (IR) communication link.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of transmitting a high-priority digital message via a communication link, the method comprising the steps of:

transmitting regular-priority digital messages between a plurality of control devices including a master control device, a first control device, and a second control device;

the master control device transmitting a first regular-priority polling message to the first control device;

the first and second control devices simultaneously transmitting a respective break character by asserting the communication link for an amount of time during a predetermined time period following the first regular-priority polling message to signal that the first and second control devices have respective high-priority digital messages to transmit;

the master control device detecting the transmission of the break characters;

suspending the transmission of the regular-priority digital messages between the plurality of control devices;

the master control device determining a Poll ID of the first control device in response to detecting the assertion of the communication link;

the master control device transmitting a report-request message to the first control device using the Poll ID of the first control device;

the first control device transmitting the respective high-priority digital message in response to the report-request message during the suspension of the transmission of the regular-priority digital messages;

the master control device subsequently determining a Poll ID of the second control device;

the master control device transmitting a report-request message to the second control device using the Poll ID of the second control device; and the second control device transmitting the respective high-priority digital message in response to the report-request message during the suspension of the transmission of the regular-priority digital messages.

2. The method of claim 1, wherein the step of transmitting regular-priority digital messages between a plurality of control devices further comprises the step of:

the first control device transmitting to the master control device a response to the first regular priority polling message.

3. The method of claim 2, further comprising the step of:

the second control device transmitting a break character by asserting the communication link for an amount of time during a predetermined time period following the first control device transmitting the respective high-priority digital message, wherein the master control device determines the Poll ID of the second control device in response to detecting the assertion of the communication link for the amount of time during the predetermined time period following the first control device transmitting the respective high-priority message.

4. The method of claim 2, wherein the step of the master control device determining the Poll ID of the first control device further comprises the master control device executing a binary search of the plurality of control devices.

5. The method of claim 4, further comprising the steps of:

ending the suspension of the transmission of the regular-priority digital messages; and transmitting regular-priority digital messages between the plurality of control devices after the step of ending the suspension of the transmission of the regular-priority digital messages.

6. The method of claim 5, further comprising the steps of:

the first control device transmitting the respective high-priority digital message only once during the suspension of the transmission of the regular-priority digital messages.

7. The method of claim 6, wherein the step of the first control device transmitting the respective high-priority digital message only once during the suspension of the transmission of the regular-priority digital messages further comprises the steps of:

the first control device setting a flag HPR_LOCK in response to the step of the first control device transmitting the respective high-priority digital message;

the first control device determining whether the flag HPR_LOCK is set prior to the step of the first control device transmitting the respective high-priority digital message; and the first control device clearing the flag HPR_LOCK in response to the step of transmitting regular-priority digital messages between the plurality of control devices after the step of ending the suspension of the transmission of the regular-priority digital messages.

8. The method of claim 5, wherein the step of the first and second control devices simultaneously transmitting a respective break character by asserting the communication link for an amount of time during a predetermined time period following the first regular-priority polling message further comprises a subset of the plurality of control devices transmitting a break character in the predetermined time period following the first regular-priority polling message; and the step of executing a binary search further comprises repeatedly executing the binary search to determine each of the subset of control devices that transmitted the break character.

9. The method of claim 1, wherein the step of transmitting regular-priority digital messages between a plurality of control devices further comprises the step of:

each of the plurality of control devices beginning to transmit a respective regular-priority digital message during a unique predetermined time slot.

10. The method of claim 9, wherein the step of the first and second control devices simultaneously transmitting the respective break characters by asserting the communication link for an amount of time during a predetermined time period following the first regular-priority polling message to signal that the first and second control devices have respective high-priority digital messages to transmit further comprises the step of:

the master control device transmitting a break character by asserting the communication link for an amount of time during a predetermined time period following one of the regular-priority digital messages.

11. The method of claim 9, wherein the step of suspending the transmission of the regular-priority digital messages between the plurality of control devices further comprises the steps of:

preventing each of the plurality of control devices from beginning to transmit the respective regular-priority digital message during the unique predetermined time slot in response to the first control device transmitting the break character; and allowing each of the plurality of control devices to begin transmitting the high-priority digital messages during the unique predetermined time slot during the suspension of the transmission of the regular-priority digital messages.

12. The method of claim 11, wherein the step of suspending the transmission of the regular-priority digital messages between the plurality of control devices further comprises preventing each of the plurality of control devices from beginning to transmit the regular-priority digital messages during the unique predetermined time slot for one timing cycle.

13. The method of claim 1, further comprising the step of:

actuating a button on the one of the plurality of control devices prior to the step of signaling that one of the plurality of control devices has a high-priority digital message to transmit.

14. The method of claim 1, further comprising the steps of:

one of the plurality of control devices receiving the high-priority digital message; and one of the plurality of control devices controlling the intensity of a lighting load in response to the high-priority message.

15. A method of transmitting high-priority digital messages from first and second devices on a communication link that links the first and second devices and a master device, the method comprising the steps of: the master device transmitting a first polling message; the first and second device each transmitting a respective high-priority break character during a predetermined time period following the master device transmitting the first polling message; the master device determining a unique link address of the first device in response to the first device transmitting the respective high-priority break character; the master device determining a unique link address of the second device in response to the second device transmitting the respective high-priority break character; the master device transmitting a second polling message to the first device in response to receiving the high-priority break character; the first device transmitting a first high-priority digital message to the master device in response to the second message; the master device subsequently transmitting a third polling message to the second device; and the second device transmitting a second high-priority digital message in response to the third polling message.

16. The method of claim 15, wherein the step of the master device determining the unique link address of the first device comprises the master device executing a binary search routine.

17. The method of claim 16, wherein the step of the master device executing the binary search routine further comprises the steps of:

the master device transmitting an HPR-search poll message including a search range of Poll IDs;

the first device determining whether the Poll ID of the first device is within the search range of Poll IDs; and the first device transmitting a search break character in a predetermined time period following the master device transmitting the HPR-search poll message when the Poll ID of the first device is within the search range of Poll IDs.

18. A method of polling a plurality of control devices on a communication link, each of the plurality of control devices having a unique Poll ID, the method comprising the steps of: sequentially transmitting a poll message to each of the plurality of control devices using the Poll ID of each control device; at least two of the control devices simultaneously transmitting break characters in a predetermined time period following one of the poll messages; suspending the sequential transmission of poll messages in response to the step of transmitting break characters; determining which two of the plurality of control devices transmitted the break characters; determining a Poll ID of each of the control devices in response to detecting the break characters; transmitting request messages to the two of the plurality of control devices that transmitted the break characters; and transmitting from the two of the plurality of control devices that transmitted the break characters high-priority digital messages in response to the request messages.

19. The method of claim 18, wherein the steps of transmitting the request messages and transmitting the break characters occur during the suspension of sequential transmission of the poll messages.

20. A method of polling a plurality of control devices by a master device selected from said plurality of control devices, the plurality of control devices each coupled to a communication link and including a unique Poll ID, the method comprising the steps of: the master device sequentially transmitting a poll message to each control device marked as active in a list of Poll IDs, the poll message including a status request; each of the control devices responding to the poll message when the respective Poll ID of the device matches one of the Poll IDs in the list of the poll message; two of the control devices transmitting a high-priority request by asserting the communication link for an amount of time during a predetermined time period following the transmission of any poll message; the master device interrupting the sequential transmission of poll messages when the high-priority request is received; and the master control device determining a Poll ID of each of the two control devices in response to detecting the assertion of the communication link; performing a binary search to find the respective Poll IDs of the two control devices that provided the high-priority requests during the interruption of the sequential transmission of poll messages.

21. A master control device for a lighting control system having a communication link coupled to a first and second control device, the master control device comprising:

a communication circuit operable to be coupled to the communication link for transmission and receipt of digital messages; and a controller coupled to the communication circuit and operable to control the transmission and receipt of the digital messages;

wherein the controller is further operable to:

transmit a first regular-priority message;

detect an assertion of the communication link by the first and second control devices for an amount of time during a predetermined time period following the transmission of the first regular-priority message signaling that the first and second control devices have respective high-priority digital messages to transmit;

determine a Poll ID of the first control device;

transmit a report-request message to the first control device using the Poll ID of the first control device;

receive the respective high-priority digital message from the first control device;

subsequently determine a Poll ID of the second control device;

transmit the report-request message to the second control device using the Poll ID of the second control device; and receive the respective high-priority digital message from the second control device.

22. A load control system comprising:

first and second control devices coupled to a communication link and including a respective Poll ID, the first and second control devices operable to receive polling messages and to transmit regular-priority digital messages in response to the polling messages; and a master control device coupled to the communication link, the master control device operable to sequentially transmit the polling messages to the first and second control devices;

wherein the first and second control devices each operable to simultaneously transmit high-priority break characters by asserting the communication link during a predetermined time period following one of the polling messages to signal that first and second control devices have respective high-priority digital messages to transmit;

the master control device operable to detect the transmission of the high-priority break characters and to suspend the transmission of the regular-priority digital messages;

the master control device operable to determine the Poll ID of the first control device in response to detecting the transmission of the high-priority break characters;

the master control device operable to transmit a report-request message to the first control device using the Poll ID of the first control device;

the first control device operable to transmit the respective high-priority digital message in response to the report-request message during the suspension of the transmission of regular-priority digital messages;

the master control device operable to subsequently determine the Poll ID of the second control device and transmit the report-request message to the second control device using the Poll ID of the second control device; and the second control device is operable to transmit the respective high-priority message in response to the report-request message during the suspension of the transmission of regular-priority digital messages.

* * * * *

UNITED STATES PATENT AND TRADEMARK OFFICE

CERTIFICATE OF CORRECTION

PATENT NO. : 7,787,485 B2
APPLICATION NO. : 11/703912
DATED : August 31, 2010
INVENTOR(S) : William H. Howe et al.

It is certified that error appears in the above-identified patent and that said Letters Patent is hereby corrected as shown below:

On the title page, Item (73), change the Assignee to:

--Assignee: Lutron Electronics Co., Inc.--

Signed and Sealed this
Fourteenth Day of August, 2012

David J. Kappos
*Director of the United States Patent and Trademark Office*